(12) United States Patent
Kim et al.

(10) Patent No.: US 12,267,447 B2
(45) Date of Patent: Apr. 1, 2025

(54) MOBILE TERMINAL

(71) Applicant: LG ELECTRONICS INC., Seoul (KR)

(72) Inventors: Youngil Kim, Seoul (KR); Sungdo Kim, Seoul (KR); Jiwoong Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 340 days.

(21) Appl. No.: 17/757,181

(22) PCT Filed: Dec. 23, 2019

(86) PCT No.: PCT/KR2019/018319
§ 371 (c)(1),
(2) Date: Jun. 10, 2022

(87) PCT Pub. No.: WO2021/132740
PCT Pub. Date: Jul. 1, 2021

(65) Prior Publication Data
US 2023/0017380 A1    Jan. 19, 2023

(51) Int. Cl.
*H04M 1/02*    (2006.01)
(52) U.S. Cl.
CPC ....... *H04M 1/0237* (2013.01); *H04M 1/0268* (2013.01)
(58) Field of Classification Search
CPC .................................................. H04M 1/0237
See application file for complete search history.

(56) References Cited

U.S. PATENT DOCUMENTS 9,557,771 B2 *   1/2017   Park ..................... H04M 1/0237
10,944,853 B2 *  3/2021   Lee ........................ H04M 1/185
(Continued)

FOREIGN PATENT DOCUMENTS

JP        2009-253772        10/2009
KR     10-2004-0082486         9/2004
(Continued)

OTHER PUBLICATIONS

PCT International Application No. PCT/KR2019/018319, Written Opinion and International Search Report dated Sep. 23, 2020, 9 pages.

*Primary Examiner* — David Bilodeau
(74) *Attorney, Agent, or Firm* — LEE, HONG, DEGERMAN, KANG & WAIMEY

(57)    ABSTRACT

Disclosed in the present application is a mobile terminal having a flexible display. The present application may provide the mobile terminal comprising: a first frame; a second frame movably attached to the first frame and configured to move in a first direction or a second direction opposite to the first direction with respect to the first frame to form a predetermined stroke; a third frame movably combined with the second frame and configured to move in the first direction or the second direction with respect to the second frame; a flexible display arranged on the front surface of the mobile terminal; a driving unit configured to move the second frame in the first or second direction with respect to the first frame and move the third frame in the first or second direction with respect to the second frame; a detecting apparatus configured to detect the extent of movement of the second frame in the first direction or the second direction; and a control apparatus configured to control the operation of the mobile terminal on the basis of the extent of (Continued)

movement of the second frame measured by the detecting apparatus.

18 Claims, 15 Drawing Sheets

(56) References Cited

U.S. PATENT DOCUMENTS

| | | | | |
|---|---|---|---|---|
| 11,016,532 | B2* | 5/2021 | Yang | H04M 1/0268 |
| 11,470,729 | B2* | 10/2022 | Kim | H04M 1/0237 |
| 2015/0153777 | A1* | 6/2015 | Liu | G06F 1/1643 |
| | | | | 345/173 |
| 2017/0212607 | A1* | 7/2017 | Yoon | G06F 3/147 |
| 2018/0103552 | A1* | 4/2018 | Seo | H05K 5/0017 |
| 2019/0261519 | A1* | 8/2019 | Park | G06F 3/04886 |
| 2021/0117012 | A1* | 4/2021 | Kim | H04B 1/3827 |
| 2022/0311848 | A1* | 9/2022 | Delaporte | H04M 1/0268 |
| 2023/0124270 | A1* | 4/2023 | Ko | G06F 1/1624 |
| | | | | 700/275 |

FOREIGN PATENT DOCUMENTS

| | | |
|---|---|---|
| KR | 10-2008-0095447 | 10/2008 |
| KR | 10-2016-0141255 | 12/2016 |

* cited by examiner (a)

(b)

(a)

(b)

(a)　　　　　　　　　　　　(b)

(a)

(b)

(c)

MOBILE TERMINAL

CROSS-REFERENCE TO RELATED APPLICATIONS

This application is the National Stage filing under 35 U.S.C. 371 of International Application No. PCT/KR2019/018319, filed on Dec. 23, 2019, the contents of which is hereby incorporated by reference herein in its entirety.

TECHNICAL FIELD

The present disclosure relates to a wireless communication system, and more particularly, to a mobile terminal in which an available size of a display or screen may be controlled.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal Recently, functions of the mobile terminal have been considerably diversified owing to the developments of the broadcasting technology and the network technology, and performance of the mobile terminal has been correspondingly improved. In particular, the mobile terminal has been developed to provide a user with various contents as well as with a simply broadcasted content. For instance, the mobile terminal can provide not only programs received from a broadcasting station but also game plays, music listening, internet shopping, user-customized information and the like using various applications. In order to perform the extended functions, the mobile terminal is basically connected to other devices or networks using various communication protocols and can provide a user with ubiquitous computing. In particular, a mobile terminal has been evolved into a smart device that enables the connectivity to networks and the ubiquitous computing.

Meanwhile, a flexible display capable of considerable deformation with sufficient elasticity has been developed recently. Such a flexible display can be deformed enough to be rolled up into a body of the mobile terminal. The mobile terminal is capable of accommodating a rolled-up flexible display and projecting the display in a desired size out of its body. Hence, using the flexible display, the mobile terminal can have a compacter structure and a display extendable in a desired size. Thus, the mobile terminal needs to be improved in structural.

DISCLOSURE

Technical Problem

An object of the present disclosure is to provide a mobile terminal configured to include a flexible display so that an available or effective display or screen may be controlled stably and reliably.

Another object of the present disclosure is to provide a mobile terminal configured not to confine a deformed portion of a flexible display to a specific location.

Another object of the present disclosure is to provide a mobile terminal configured to stably support an extended flexible display.

Another object of the present disclosure is to provide a mobile terminal configured to prevent a deformed portion of a flexible display from being damaged by an external impact.

Another object of the present disclosure is to provide a mobile terminal configured to accurately form an intended size of a screen by movement of a flexible display.

Technical Solutions

In accordance with an aspect of the present disclosure, a mobile terminal may include a first frame; a second frame movably coupled to the first frame, and configured to move in a first direction with respect to the first frame or in a second direction opposite to the first direction so as to form a predetermined stroke; a third frame movably coupled to the second frame and configured to move in the first direction or the second direction with respect to the second frame; a flexible display including a first region disposed at a front surface of the mobile terminal and coupled to the first frame, a second region disposed at a rear surface of the mobile terminal and coupled to the third frame, and a third region formed to extend between the first and second regions, wherein the third region is wound on the second frame and is selectively disposed on the front surface of the mobile terminal or the rear surface of the mobile terminal; a driving unit configured to move the second frame in the first or second direction with respect to the first frame and to move the third frame in the first or second direction with respect to the second frame; a detection device configured to detect the amount of movement of the second frame moving in the first or second direction; and a controller configured to control operation of the mobile terminal based on the amount of movement of the second frame measured by the detection device.

In order to expand a screen on the front surface of the mobile terminal, the driving unit may be configured to move the second and third frames in the first direction to switch the mobile terminal from a first state to a second state, wherein, in the first state, only a first region of the flexible display is disposed at the front surface of the mobile terminal, and in the second state, the third region is disposed at the front surface of the mobile terminal along with the first region; and in order to perform switching to the second state, the driving unit is configured to draw the third region from the second frame to the front surface of the mobile terminal according to movement of the second frame moving in the first direction. In order to contract a screen on the front surface of the mobile terminal, the driving unit is configured to move the second and third frames in the second direction to switch the mobile terminal from the second state to the first state; and in order to perform switching to the first state, the driving unit is configured in a manner that the drawn third region is contracted from the front surface of the mobile terminal to the second frame.

The detection device may be configured to measure a change in capacitance generated in at least one capacitor provided to the first and second frames by the movement of the second frame, and the controller may be configured to determine the amount of movement of the second frame based on a change in the generated capacitance. The capacitor may include conductors respectively arranged in the first and second frames to face each other, wherein the conductors are configured to have an overlap area that is changed in size while the second frame relatively moves with respect to the first frame to change the capacitance.

The detection device may include a first capacitor configured to indicate an absolute position of the second frame within the stroke of the second frame. The first capacitor may be configured to generate a first capacitance that is continuously changed during the stroke of the second frame. The first capacitor may include a first conductor provided to any one of the first and second frames, and extending to have a shape that is continuously changed over a stroke distance of the second frame; and a second conductor provided to the other one from among the first and second frames and disposed to face the first conductor, wherein any one of the first and second conductors is configured to generate a first capacitance that is continuously changed during the stroke of the second frame while relatively moving with respect to the other one from among the first and second conductors.

The detection device may further include a second capacitor configured to generate a second capacitance that is a predetermined reference capacitance during the stroke of the second frame. The second capacitance may have a constant value over the stroke of the second frame. The second capacitor may include a third conductor provided to any one of the first and second frames and extending to have the same shape over a stroke distance of the second frame, and a fourth conductor provided to the other one from among the first and second frames and disposed to face the third conductor, wherein any one of the third and fourth conductors is configured to generate a constant second capacitance during the stroke of the second frame while relatively moving with respect to the other one from among the third and fourth conductors. The controller may be configured to determine the position and movement amount of the second frame based on the amount of change of the first capacitance with respect to the second capacitance.

The detection device may further include a third capacitor configured to generate a third capacitance consisting of sub-capacitances that are repeated at intervals of a predetermined distance within the stroke of the second frame. Each of the sub-capacitances may be configured to be changed according to the movement of the second frame. The third capacitor may include a fifth conductor provided to any one of the first and second frames, and configured to have segments that have the same shape while being arranged at intervals of a predetermined distance within the stroke of the second frame; and a sixth conductor provided to the other one from among the first and second frames and disposed to face the fifth conductor, wherein any one of the fifth and sixth conductors is configured to generate constant sub-capacitances at intervals of a predetermined distance during the stroke of the second frame while relatively moving with respect to the other one from among the fifth and sixth conductors. The controller may be configured to: calculate the number of segments of the fifth conductor through which the second frame has passed, based on the amount of change in the first capacitance with respect to the second capacitance; calculate a relative position of the second frame at a segment through which the second frame is passing, based on the amount of change in the sub-capacitance with respect to the second capacitance; and calculate a position of the second frame based on the calculated number of segments and the calculated relative position.

The detection device may further include a first position capacitor configured to detect that the second frame is located at a start point of the stroke. The detection device may further include a second position capacitor configured to detect that the second frame is located at an end point of the stroke. The first position capacitor may include a first position conductor disposed at a start point of the stroke of the second frame; and a second position conductor configured to face the first position conductor when the second frame is disposed at the start point of the stroke. The second position capacitor may include: a third position conductor disposed at an end point of the stroke of the second frame; and a fourth position conductor configured to face the third position conductor when the second frame is disposed at an end point of the stroke. When the first position capacitor generates a capacitance equal to or greater than a predetermined threshold, the controller may be configured to determine that the second frame is located at the stroke start point; and when the second position capacitor generates a capacitance equal to or greater than a predetermined threshold, the controller may be configured to determine that the second frame is located at the stroke end point.

Advantageous Effects

According to the present disclosure, a mobile terminal may include a plurality of frames movably coupled with each other. Extension and contraction of a flexible display by relative movements of these frames, precisely, extension and contraction of a flexible display region exposed on the front surface of the mobile terminal may be effectively guided. Accordingly, the mobile terminal may stably and reliably adjust the size of an available display or screen by the combination of the flexible display and the frames.

Additionally, the flexible display may be configured to be rolled in or rolled out from a frame of the mobile terminal, for extension and contraction. Accordingly, since a deformed portion of the flexible display is continuously changed during the rolling, a specific portion of the flexible display may not be continuously deformed. Accordingly, fatigue and damage of the specific portion of the flexible display may be prevented, thereby increasing the durability of a flexible display unit.

Additionally, frames may extend and contract together when the flexible display is extended and contracted. Accordingly, the extended or contracted flexible display may be stably supported by the frames. Further, the frames are configured to cover a deformed portion of the flexible display, particularly a rolled portion, thereby preventing the deformed portion of the flexible display from being damaged by an external impact.

Further, the mobile terminal may include a detection device configured to accurately detect the amount of movement for contraction and extension of a flexible display. Based on the amount of movement obtained through the detection device, the intended exact size of the screen may be implemented.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Embodiments described herein include configurations for applying a flexible display to a mobile terminal. However, the principles and configurations of the described embodiments may be equally applied to every display device using a flexible display.

Figure 1:
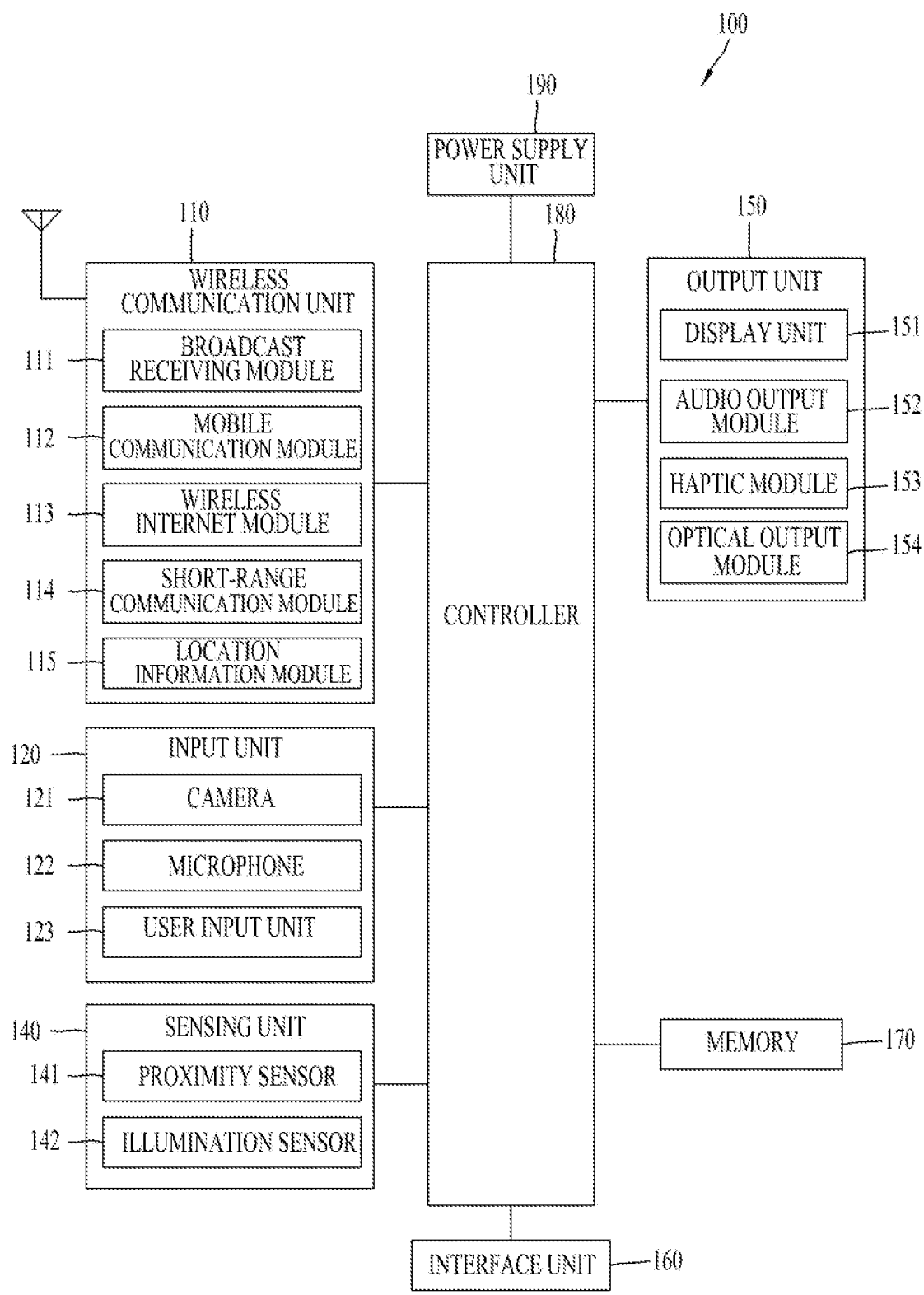
FIG. 1 is a block diagram illustrating an overall configuration of a mobile terminal according to the present disclosure.

FIG. 1 is a block diagram of a mobile terminal in accordance with the present disclosure.

The mobile terminal 100 is illustrated as having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1 is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideB and (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is illustrated having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
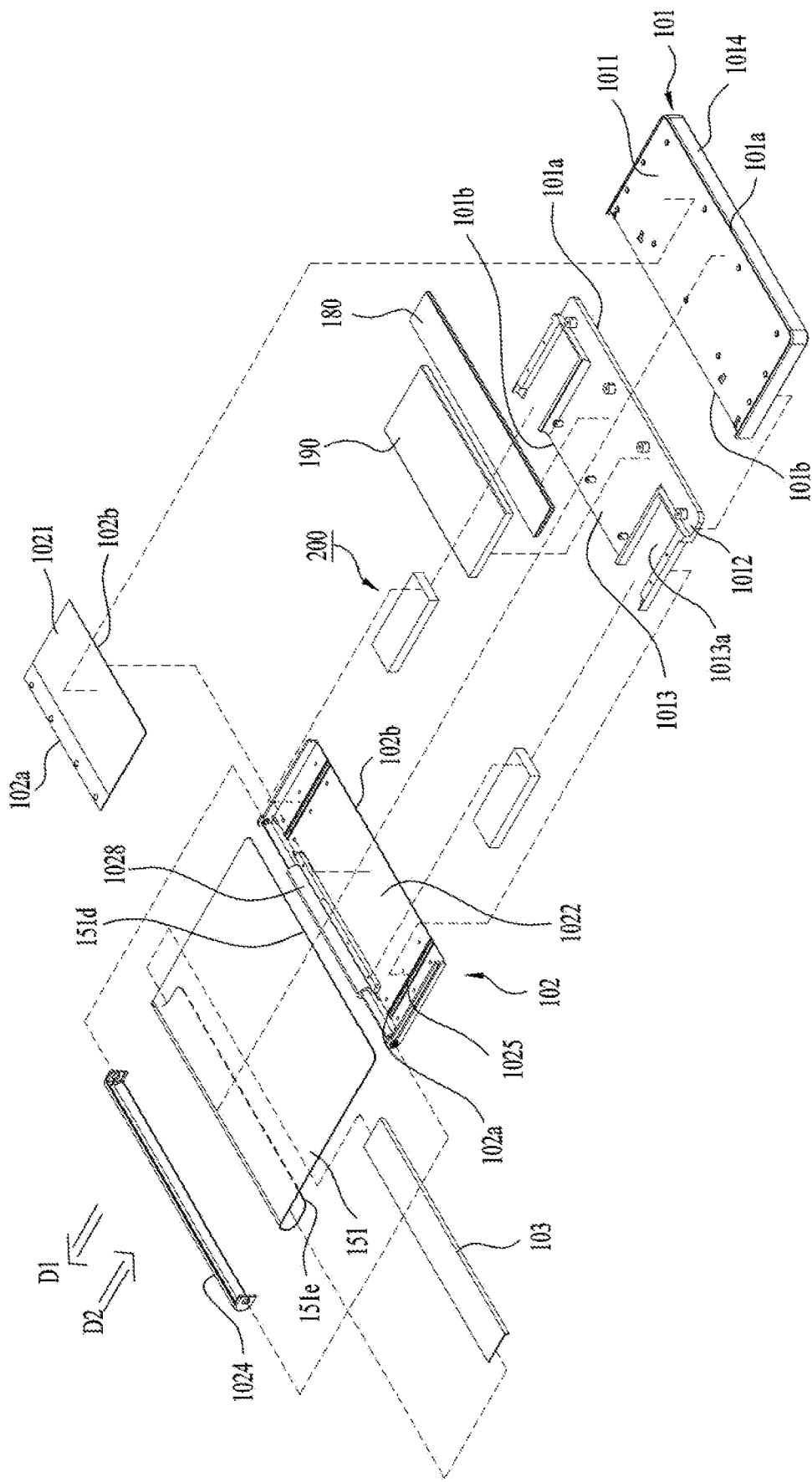
FIG. 2 is an exploded perspective view illustrating the mobile terminal according to the present disclosure.
Figure 3:
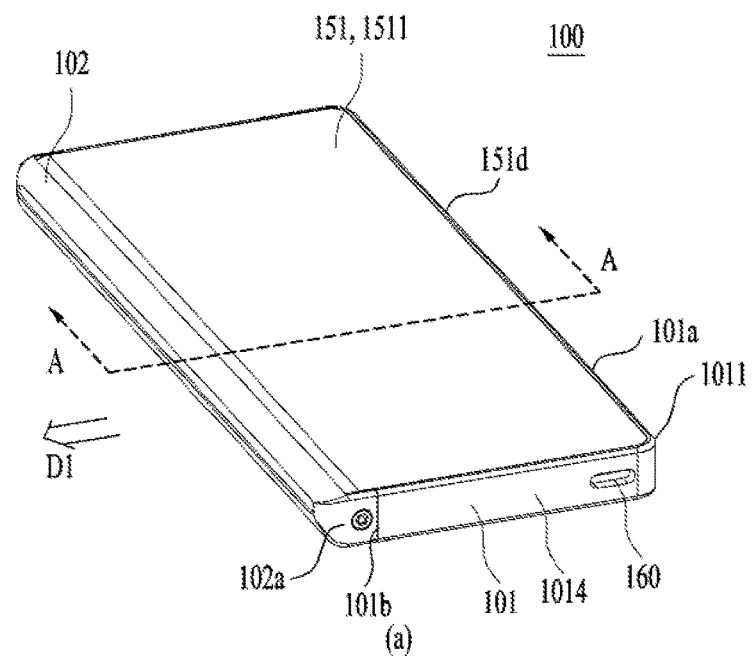
FIG. 3 is a perspective view illustrating first and second states of the mobile terminal viewed from one side.
Figure 3:
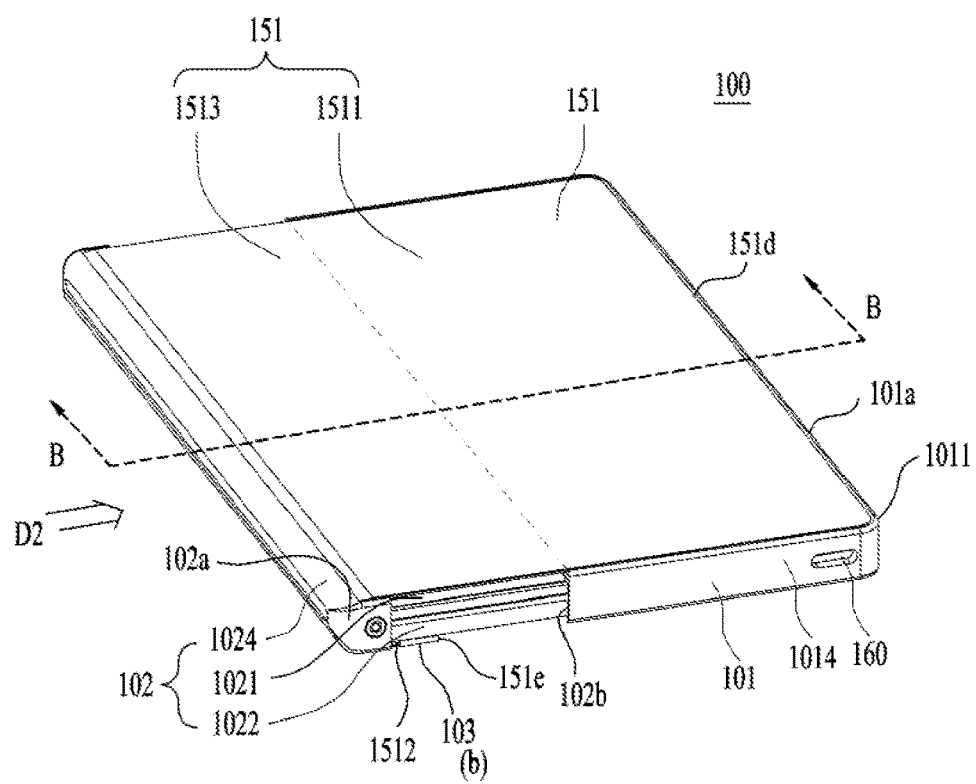
Figure 4:
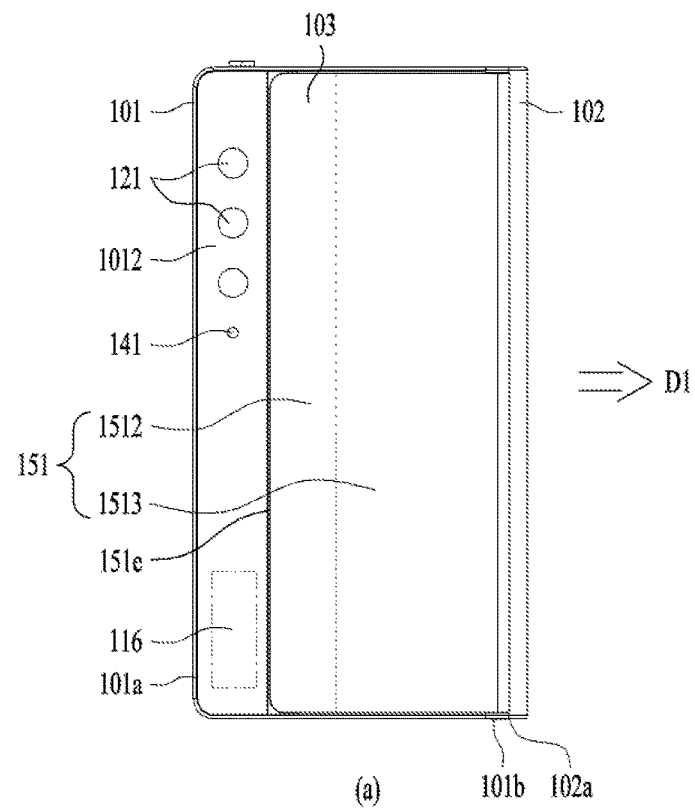
FIG. 4 is a rear view illustrating the first and second states of the mobile terminal.
Figure 4:
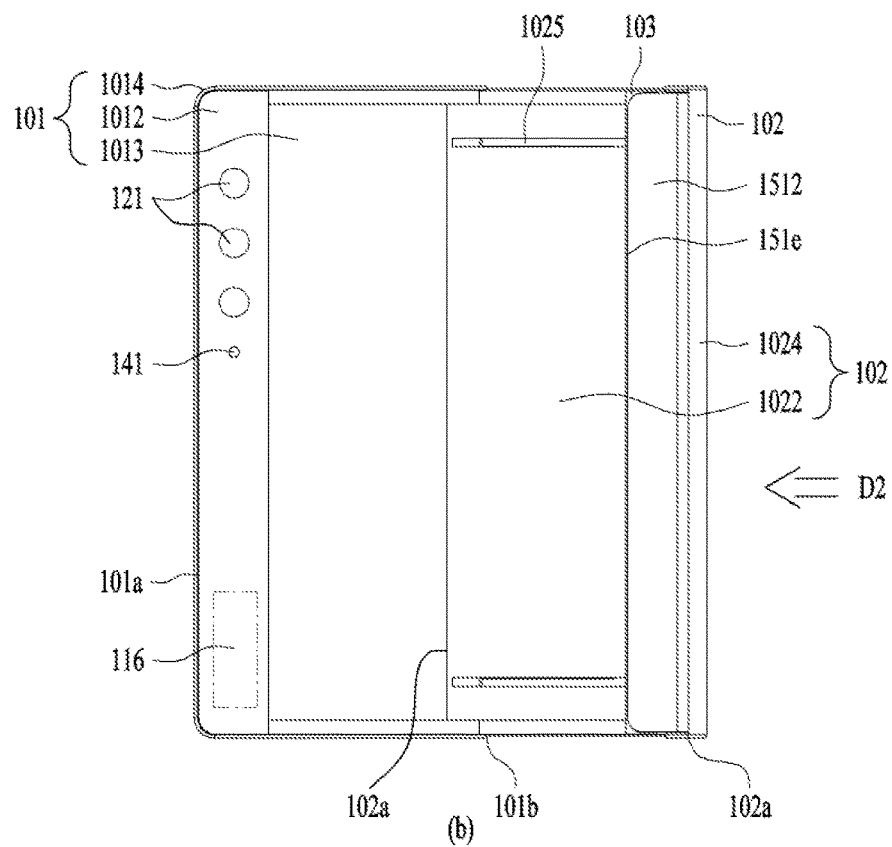
Figure 5:
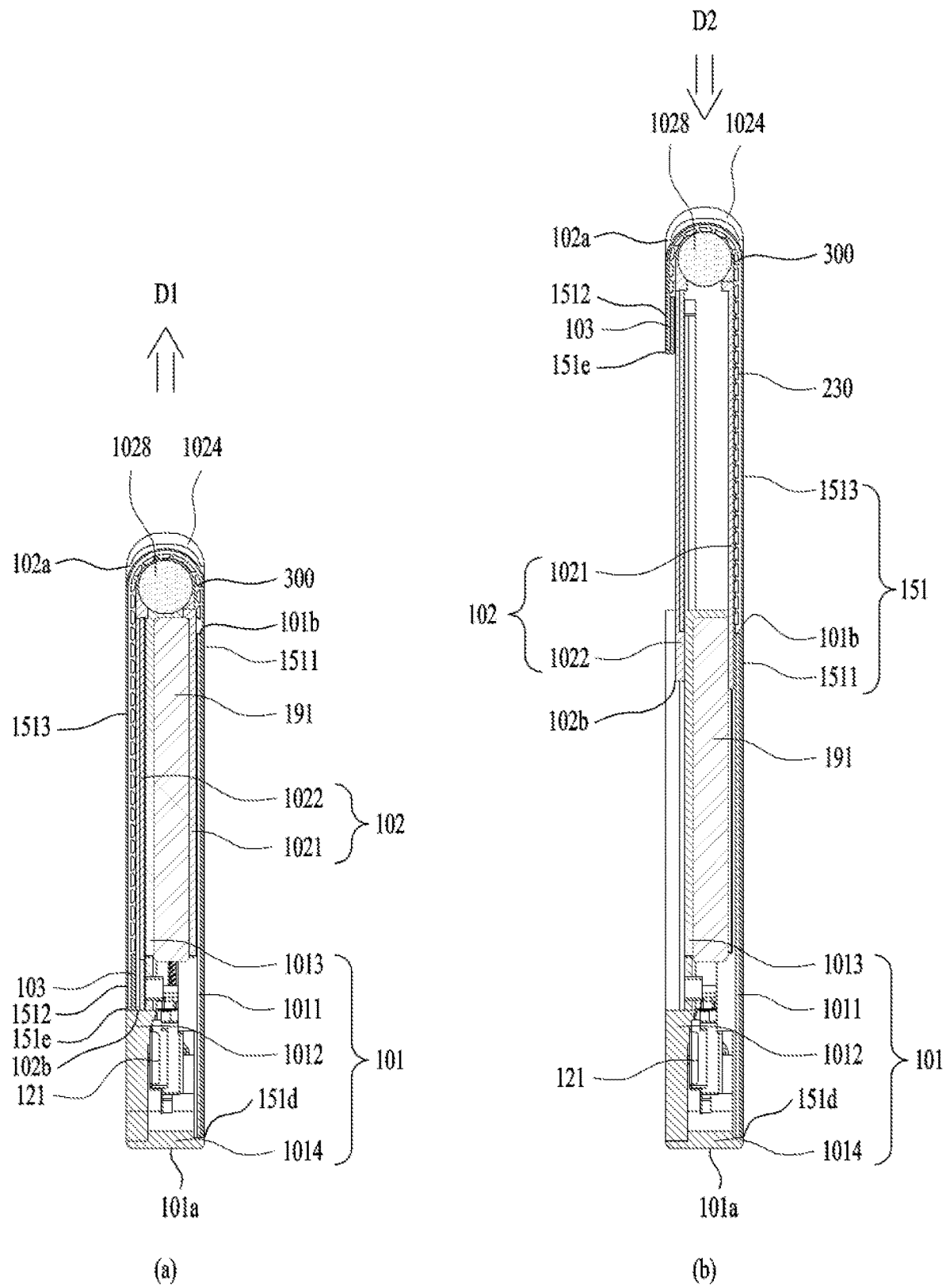
FIG. 5 is a sectional view illustrating the first and second states of the mobile terminal, taken along lines A-A and B-B of FIG. 2, respectively.

FIG. 2 is an exploded perspective view illustrating a mobile terminal according to the present disclosure. FIG. 3 is a perspective view illustrating first and second states of a mobile terminal viewed in one lateral side. FIG. 4 is a rear view illustrating first and second states of a mobile terminal. FIG. 5 is a sectional view illustrating first and second states of a mobile terminal, obtained along the cutting lines A-A and B-B of FIG. 2, respectively. In the above drawings, FIG. 3(*a*), FIG. 4(*a*) and FIG. 5(*a*) illustrate a first state of a mobile terminal and FIG. 3(*b*), FIG. 4 (*b*) and FIG. 5(*b*) illustrates a second state of the mobile terminal.

As illustrated in the drawings, a mobile terminal 100 of a first state is contracted (or retracted) and has a size smaller than that of the mobile terminal 100 of a second state. Moreover, a size of a display 151 located on a front surface of the mobile terminal 100 becomes smaller than that in a second state. On the other hand, the mobile terminal 100 of the first state is extended in a first direction D1 so as to switch to the second state. In the second state, a size of the mobile terminal 100 and a size of the display 151 located on the front surface become greater than those of the first state. In the following description, a direction in which the mobile terminal 100 and the display 151 thereof are extended (or enlarged) is referred to as a first direction D1, a direction in which the mobile terminal 100 and the display 151 thereof are contracted (or retracted) or reduced is referred to as a second direction D2, and a direction vertical to the first and second directions D1 and D2 is referred to as a third direction.

The mobile terminal 100 of the present disclosure may switch from the first state in which the display 151 is located on the front surface like a bar-type mobile terminal like FIG. 3(*a*) to the second state by extending the screen like FIG. 3 (*b*). In the second state, a size of the display 151 located on the front surface is enlarged and a size of the display 151 located on a rear surface is reduced like FIG. 4(*b*). Namely, the display 151 used to be located on the rear surface of the mobile terminal 100 in the first state is moved to the front surface of the mobile terminal 100 in the second state.

Thus, in order for a position of the display to be variable, the display may employ a flexible display unit 151. A flexible display means a display that is light-weighted, easily-unbreakable and heavy-duty display fabricated on a thin and flexible substrate capable of curving, bending, folding, twisting and rolling-up like a paper by maintaining the properties of the existing flat panel display.

Moreover, an electronic paper employs a display technology provided with the features of the normal ink and may differ from the existing flat panel display in using reflective light. The electronic paper may change information by electrophoresis using twist balls or capsules.

In a state that the flexible display unit 151 is not deformed (e.g., a state having an infinite curvature radius: hereinafter a basic state), a display region of the flexible display unit 151 becomes a plane. In a state deformed from the basic state by an external force (e.g., a state having a finite curvature radius: hereinafter a deformed state), the display region may become a curved surface. As illustrated in the drawing, information displayed in the deformed state may become visual information outputted to the curved surface. Such visual information is implemented in a manner that light emittance of subpixels deployed in a matrix form is controlled independently. The subpixel means a minimum unit for implementing a single color.

The flexible display unit 151 may lie not in a flat state but in a curved state (e.g., a top-bottom or right-left curved state) from the basic state. In this case, if an external force is applied to the flexible display unit 151, the flexible display unit 151 may be deformed into a flat state (or a less-curved state) or a more-curved state.

Meanwhile, the flexible display unit 151 may implement a flexible touchscreen by being combined with a touch sensor. If a touch is applied to the flexible touchscreen, the controller 180 (see FIG. 1) may perform a control in response to such a touch input. The flexible touchscreen may be configured to sense a touch input in the deformed state as well as in the basic state.

The touch sensor senses a touch (or a touch input) applied to the touchscreen using at least one of various touch types such as a resistance layer type, an electrostatic capacitance type, an infrared type, an ultrasonic type, etc.

For example, a touch sensor may be configured to convert a pressure applied to a specific portion of a touchscreen or a variation of electrostatic capacitance generated from the specific portion into an electric input signal. A touch sensor may be configured to detect a position or size of the touch sensor touched by a touch target applying a touch to a touchscreen, a pressure of the touch, an electrostatic capacitance of the touch, etc.

The size changes of the display unit 151 on the front and rear surfaces of the mobile terminal according to the state switching (first or second state) of the flexible display unit 151, i.e., the size change of the mobile terminal 100 may be performed manually by a force applied by a user, which is non-limited by the manual way. For example, when the mobile terminal 100 or the flexible display unit 151 is in the first state, it may be deformed into the second state by a command of a user or application without an external force applied by the user. Thus, in order for the flexible display unit 151 to be automatically deformed without such an external force, the mobile terminal 100 may include a driving unit 200 described later.

The flexible display unit 151 of the present disclosure is rolled round a predetermined one of both side parts of the mobile terminal 100, thereby being folded at 180°. Hence, one portion of the display unit 151 is disposed on the front surface of the mobile terminal 100 with reference to such a side part, while the rest is disposed on the rear surface of the mobile terminal 100. Some portion of the display unit 151 located on the front surface of the mobile terminal 100 may be fixed to the front surface not to move, while the rest of the display unit 151 located on the rear surface of the mobile terminal 100 may be provided to be movable on the rear surface. The display unit 151 may be rolled or unrolled round the side part, whereby a size of the region disposed on the front surface of the mobile terminal 100 may be adjusted by moving a part of the display unit 151 disposed on the rear surface of the mobile terminal 100. Since a size of the flexible display unit 151 is determined and the flexible display unit 151 includes a single continuous body, if a size of the flexible display unit 151 located on the front surface of the mobile terminal 100 is increased, a size of the flexible display unit 151 located on the rear surface of the mobile terminal 100 is decreased. The above-configured display unit 151 may be rolled within the second frame 102 relatively movable to the first frame 101, which will be described later, and more specifically, around a predetermined side part of the second frame 102, and withdrawn (or pulled out) from or inserted (or pushed) into the second frame 102 by being rolled around the second frame 102 along a moving direction of the second frame 102 to adjust the size of the display unit 151 on the front surface of the mobile terminal 100. Such an operation will be described in detail together with other related components of the mobile terminal 100.

Typically, an antenna is provided to the case of housing of the mobile terminal 100. Yet, an antenna installed portion of the case or housing may be restricted by the flexible display unit 151 that covers the front surface of the mobile terminal 100 up to the rear surface. For that reason, an antenna may be implemented on the flexible display unit 151. An Antenna On Display (AOD) includes an antenna configured in a manner of forming a transparent film with patterned electrode layers and dielectric layers laid one upon another. As the AOD can be implemented thinner than Laser Direct Structuring (LDS) with Cu-Ni plating, it barely affects thickness and does not come into view, advantageously. And, the AOD may directly transceive signals with the display unit 151. Therefore, the AOD is available for the mobile terminal 100 having the display unit 151 located on both sides thereof.

Specific configuration of the mobile terminal 100 of the present disclosure is described in detail with reference to FIGS. 2 to 5 as follows. In the following description, FIG. 2 illustrating the overall configuration is referred to basically and FIGS. 3 to 5 are referred to describe the specific features of the corresponding components in the first and second states of the mobile terminal 100.

The mobile terminal 100 of the present disclosure may include a first frame 101, a second frame 102 moving in a first direction against the first frame 101, and a third frame 103 moving in the first direction against the second frame 102. The first and second frames 101 and 102 include a front part, a rear part and a lateral part, which are coupled together. Therefore, the mobile terminal 100 may form a hexahedral exterior with the coupled first and second frames 101 and 102. Considering the configuration of the illustrated first to third frames 101 to 103, movement of the second and third frames 102 and 103 may become slide movement.

First of all, the first frame 101 corresponds to a main body of the mobile terminal 100 and may form a space inside to receive various parts therein. And, the first frame 101 may receive the second frame 102, which is movably coupled to the first frame 101, within such a space. Particularly, as illustrated in FIG. 2 and FIG. 5, the first frame 101 may include a first front part 1011 disposed on the front surface of the mobile terminal 100 and first and second rear parts 1011 and 1012 disposed on the rear surface of the mobile terminal 100. Each of the first front part 1011, the first rear part 1012 and the second rear part 1013 may include an approximately flat plate-type member. The first rear part 1012 and the second rear part 1013 may include separate members coupled together or a single member illustrated in the drawing. In order to form a predetermined space, the first font part 1011 and the first/second rear part 1012/1013 may be spaced apart from each other in a predetermined gap and connected to each other by a lateral part 1014. As parts of the mobile terminal 100, the controller 180 and the power supply unit 190 may be received in the space within the first frame 101. For example, the controller 180 may include a circuit board including a processor and electronic circuit for controlling operations of the mobile terminal 100 and the power supply unit 190 may include a battery and related parts. Moreover, the second frame 102 and the driving unit 200 described alter may be received in the first frame 101 as well.

As described above, the display unit 151 has the continuous body and may be disposed on both of the front and rear surfaces of the mobile terminal 100 by being rolled up within the mobile terminal 100. Hence, a portion of the display unit 151 may be disposed on the first front part 1011 corresponding to the front surface of the mobile terminal 100 and the rest may be disposed on the first and second rear parts 1012 and 1013 corresponding to the rear surface of the mobile terminal 100, simultaneously. On the other hand, as well illustrated in FIG. 4, for the installation of various physical input units 120 and sensor units 140 for manipulations of the mobile terminal 100, the display unit 151 may be disposed on the second rear part 1013 only. Since the first rear part 1012 is always exposed externally, the input unit 120 such as various buttons, switches, the camera 121 and a flash and the sensor unit 140 such as the proximity sensor 141 may be disposed on the first rear part 1012. A typical bar-type terminal includes a display unit provided to a front surface of the terminal only. Hence, a camera is disposed on a rear surface of the terminal in order to capture an image by viewing a thing located at the opposite side of a user through a display unit. In order for the user to capture himself by viewing himself through the display unit, an additional camera needs to be provided to the front surface of the terminal. Yet, according to the mobile terminal 100 of the present disclosure, the display unit 151 is located on both of the front and rear surfaces thereof. Therefore, when a user takes a selfie, the display unit located on the same side of the camera 121, i.e., a portion of the display unit 151 located on the rear surface of the mobile terminal 100 in the drawing may be used. When a thing at the opposite side of the user is captured, the display unit located on the opposite side of the camera 121, i.e., a portion of the display unit 151 on the front surface of the mobile terminal 100 in the drawing may be used. For that reason, the mobile terminal 100 may capture a thing located at the opposite side of a user or a selfie using the single camera 121. The camera may include a plurality of cameras of different view angles such as a wide angle, a super wide angle, a telescope, etc. A proximity sensor, an audio output module and the like may be located on the first rear part 1012 as well as the camera, and an antenna 116 may be installed thereon.

The lateral part 1014 may be elongated along edges of the first front part 1011 and the first/second rear part 1012/1013 to enclose a circumference of the first frame 101 and form an exterior of the mobile terminal 100. Yet, as mentioned above, since the second frame 102 is received in the first frame 101 and movably coupled thereto, a portion of the first frame 101 needs to be open to allow the relative movement of the second frame 102 to the first frame 101. As well illustrated in FIG. 2, for example, since the second frame 102 is movably coupled to one of both side parts of the first frame 101, the lateral part 1014 is not formed at such a side part, thereby opening it. Hence, the first frame 101 may include a first side part 101a substantially closed and a second side part 101b disposed to oppose the first side part 101a so as to be open. Since the lateral part 1014 is exposed from the mobile terminal 100, the interface unit 160 for connecting to a power port or an earphone jack or the user input unit 120 such as a volume button and the like may be disposed thereon. In case of containing metal substance, the lateral part 1014 may play a role as an antenna.

Referring to FIG. 2, the second frame 102 may include a second front part 1021 disposed on the front surface of the mobile terminal 100 and a third rear part 1022 disposed on the rear surface of the mobile terminal 100. Like the first front part 1011, the first rear part 1012 and the second rear part 1013 of the first frame 101, each of the second front part 1021 and the third rear part 1022 may be formed of an approximately flat plate-type member. Moreover, the second frame 102 may receive various parts therein and should not interfere with the parts received in the first frame 101 while moving. Hence, the second front part 1021 and the third rear part 1022 may be coupled together in a manner of being spaced apart from each other and have a shape not interfering with the parts within the first frame 101.

Moreover, the display unit 151 may be folded at 180° while being rolled up within the second frame 102 so as to be disposed on both of the front and rear surfaces of the mobile terminal 100. For such arrangement of the display 151, the second frame 102 may include a roller 1028 rotatably disposed therein. The roller 1028 may be disposed at a random position within the second frame 102. Yet, the display 151 should be spread flat on the front and rear surfaces of the mobile terminal 100 to provide a user with a screen of a good quality. For such a spread, an appropriate tension should be provided to the display 151. In order to provide the appropriate tension, the roller 1028 may be preferably located distant from the first side part 101a of the first frame 101 adjacent to a side edge (or a side end) (i.e., a side end 151d in the drawing) of the display 151. As illustrated in FIG. 2, the second frame 102 includes two first and second side parts 102a and 102b confronting each other, and the first side part 102a may be located farther than the second side part 102b from the first frame, and more specifically, the first side part 101a of the first frame. For that reason, the roller 1028 may be disposed on the first side part 102a of the second frame 102 confronting the first side part 101a of the first frame 101. The roller 1028 may be elongated in a length direction of the mobile terminal 100, i.e., a length direction of the second frame 102, and coupled to the second frame 102, and more specifically, to top and bottom sides of the third rear part 1022. The display unit 151 may be rolled around the roller 1028 by being gradually curved with a predetermined curvature. Moreover, the roller 1028 may be installed to freely rotate on the second frame 102 by contacting with an inner surface of the display unit 151. Therefore, the roller 1028 is substantially capable of moving the display unit 151 in a direction vertical to a lateral direction, i.e., a length direction of the mobile terminal 100. As described later, when the second frame 102 is slid, the display unit 151 is moved by the tension applied by the second frame 102 to the front or rear surface of the mobile terminal 100 relatively to the second frame 102 in a different direction (i.e., the first direction D1 or the second direction D2). In doing so, such a movement may be guided by the roller 1028 that is rotating.

Moreover, the roller 1028 is disposed on the first side part 102a of the second frame 102, and the first side part 102a substantially corresponds to a most outer side part of the mobile terminal 100. If the first side part 102a of the second frame 102 is exposed, the display unit 151 rolled around the roller 1028 may be broken or damaged. Hence, the second frame 102 may include a side frame 1024 disposed on the first side part 102a. The side frame 1024 may be elongated long in a length direction of the second frame 102 so as to cover the first side part 102a, thereby protecting the roller 1028 and the display unit 151 rolled around the roller 1028. By the side frame 1024, the second frame 102 may have the first side part 102a that is substantially closed. And, the side frame 1024 may substantially form an exterior of the mobile terminal 100 together with the lateral part 1014 of the first frame 101. Moreover, in order to minimize the interference with the parts within the frame 101 in the course of moving, the second frame 102 may include a second side part 102b disposed to confront the first side part 102a and configured open.

The above-configured second frame 102 is movably coupled to the first frame 101, thereby being configured to slide in a predetermined first or second direction D1 or D2 against the first frame 101. Specifically, as illustrated in the drawing, the second frame 102 may be movably coupled to the first frame 101 through the side part of the first frame 101, and more particularly, through the open second side part 101b. More specifically, the second side part 102b of the second frame 102 is disposed relatively adjacent to the closed first side part 101a of the first fame 101, whereby the first side part 102a of the second frame 102 may be disposed to control the first side part 101a. Therefore, the second side part 102b is inserted into the first frame 101 through the side part of the first frame 101, i.e., the second side part 10b thereof. The first side part 102b is not inserted into the first frame 101 but is always located outside the first frame 101, thereby forming the exterior of the mobile terminal 100 as described above. Yet, if necessary, the first side part 102b of the second frame 102 may be inserted into the first frame 101.

Owing to the above location relation, the second frame 102 may be enlarged or contracted from the first frame in a direction vertical to a length direction of the mobile terminal 100 or the first frame 101. Namely, each of the first and second directions D1 and D2 may be a direction vertical to a length direction of the mobile terminal 100 or the first frame 101 basically. On the other hand, each of the first and second directions D1 and D2 may be explained as a lateral or horizontal direction of the mobile terminal 100 or the first frame 101. Moreover, in the movement of the first direction D1, the second frame 102 is extended from the first frame 101, whereby the first direction D1 may become a direction that the second frame 102 gets away from the first frame 101, i.e., a direction the second frame 102 moves outwardly from the mobile terminal or the first frame 101. On the other hand, in the movement of the second direction D2, the second frame is contracted toward the first frame 101. Hence, the second direction D2 is a direction confronting the first direction D1 and may become a direction that the second frame 102 gets closer to the first frame 101, i.e., a direction that the second frame 102 moves inwardly into the mobile terminal 100 or the first frame 101. When moving in the first direction D1, the second frame 102 is extended and applies a force to a portion of the display unit 151 used to be disposed on the rear surface of the mobile terminal 100 so as to dispose it on the front surface of the mobile terminal 100 additionally, thereby forming a region for such an additional disposition. Therefore, the second frame 102 may switch the mobile terminal 100 to the second state of having a relatively extended front display 151 by the movement in the first direction D1. On the other hand, when moving in the second direction D2, the second frame 102 is contracted into the original state and applies a force to a portion of the display unit 151 used to be disposed on the front surface of the mobile terminal 100 so as to return it to the rear surface of the mobile terminal 100. Therefore, by the movement in the second direction D2, the second frame 102 may switch the mobile terminal 100 to the first state of having a relatively reduced front display unit 151. Thus, the second frame 102 selectively exposes the display unit 151 on the front surface of the mobile terminal 100 according to the moving direction (i.e., the first direction D1 or the second direction D2), thereby switching the mobile terminal 100 to the above-defined first or second state.

In the course of the above-mentioned extension and contraction in the first and second directions D1 and D2, the second frame 102 may overlap with the first frame 101, and more specifically, with the first front part 1011, the first rear part 1012 and the second rear part 1013 of the first frame 101 so as not to interfere with the first frame 101. Particularly, as described above, the display unit 151 may be coupled by the first front part 1011 of the first frame 101 and then supported by it, thereby being unnecessary to be additionally supported by the second front part 1021 of the second frame 102. Instead, if the second front part 1021 is inserted between the first front part 1011 and the display unit 151, the display unit 151 may be deformed or broken by the friction with the second front part 1021 that is moving repeatedly. Hence, as well illustrated in FIG. 5, the second front part 1021 may be disposed below the first front part 1011. Namely, a front surface of the second front part 1021 may confront a rear surface of the first front part 1011. Moreover, in order to stably support the movement of the second frame 102, the rear surface of the first front part 1011 may contact with the front surface of the second front part 1021. As described above, a portion of the display unit 151 is moved to the front surface and the rear surface of the mobile terminal 100 according to the moving direction D1 or D2 of the second frame 102. Hence, in order for the display unit 151 to move smoothly, it may be advantageous that the display unit 151 is configured to move together with the second frame 102 instead of the first frame 101 that is stopped relatively. In order to move by linking to the second frame 102, the display unit 151 may need to be coupled to the second frame 102. Hence, the third rear part 1022 of the second frame 102 may be disposed below the second rear part 1013 of the first frame 101. Namely, a front surface of the third rear part 1022 may confront the rear surface of the second rear part. In order to stably support the movement of the second frame 102, the rear surface of the second rear part 1013 may contact with the front surface of the third rear part 1022. By such disposition, the third rear part 1022 may be exposed from the first frame 101, and more exactly, from the second rear part 1013 and coupled to the display unit 151.

The second frame 102 may extend or reduce a size of the mobile terminal 100 itself, and more particularly, the front surface of the mobile terminal 100 by the extension and contraction in the first and second directions D1 and D2, and the display unit 151 should move by the extended or reduced front surface to obtain the intended first or second state. Yet, if the second frame 102 is fixed, the display unit 151 is unable to smoothly move to keep up with the extended or reduced front surface of the mobile terminal 100. For that reason, the display unit 151 may be movably coupled to the second frame 102. Particularly, the display unit 151 may include a first side end (or edge) 151d disposed on the front surface of the mobile terminal 100 and a second side end (or edge) 151e provided to the rear surface of the mobile terminal 100 by confronting the first side end. The first side end 151d is disposed on the front surface of the first frame 101, i.e., the front surface of the first front part 1011 of the first fame 101 in a manner of being adjacent to the side part of the mobile terminal 100, i.e., the first side part 101a of the first frame 101. On the contrary, as the second side end 151e is adjacent to the rear surface of the mobile terminal 100, i.e., the third rear part 1022 of the second frame 102, it may be coupled to the third rear part 1022 of the second frame 102 so as to be movable in the first and second directions D1 and D2. Moreover, since the display 151 is not strong structurally, the third frame 103 may be coupled to the second side end 151e. The third frame 103 may include a panel member elongated long in the length direction of the mobile terminal 100. Hence, the third frame 103 may be coupled to the second frame 102, i.e., the third rear part 1022 thereof instead of the second side end 151e so as to be movable in the first and second directions D1 and D2. The second frame 102 may include a slot 1025 elongated in a lateral direction of the mobile terminal 100 or the second frame 102, i.e., a direction vertical to the length direction thereof, and the third frame 103 may stably move by being guided by the slot 1025. The third frame 103 may include a protrusion inserted in the slot 1025 for example for the movement along the slot 1025.

Referring to FIGS. 3 to 5, in association with the above configurations of the first to third frames 103, the display unit 151 may include a first region 1511 elongated in a predetermined length from one side of the display unit 151, i.e., the first side end 151d toward the confronted second side end 151e and a second region 1512 disposed to confront the first region 1511 and elongated in a predetermined length from the second side end 151e toward the first side end 151d. And, the display unit 151 may include a third region 1513 disposed between the first region 1511 and the second region 1512. The first to third regions 1511 to 1513 are connected to one another and may form a continuous body of the display unit 151. As described above, for the movement to the front or rear surface of the mobile terminal 100 of the third region 1513 according to the moving direction of the second frame 102, the first region 151 may be fixed to the front surface of the mobile terminal 100 so as not to be movable and the second region 1512 may be movably provided to the rear surface of the mobile terminal 100. Such a configuration of the display unit 151 is described in detail as follows.

The first region 1511 may be disposed on the front surface of the mobile terminal 100, and more particularly, to the front surface of the first front part 1011. The first region 1511 is fixed to the first frame 101, i.e., the front surface of the first front part 1011 so as not to move in the course of the movement of the second frame 102, thereby being always exposed to the front surface of the mobile terminal 100. The third region 1513 is adjacent to the first region 1511 and may be rolled around the roller 1028 by extending into the second frame 102. The third region 1513 may continuously extend out of the second frame 102 so as to cover the second frame 102, i.e., the rear surface of the third rear part 1022 in part. On the other hand, the second frame 102, i.e., the third rear part 1022 is adjacent to the first frame 101, i.e., the second rear part 1013 so as to form the rear case of the mobile terminal 100 together, whereby the third region 1513 may be described as disposed on the rear surface of the first frame 101 as well.

The second region 1512 is adjacent to the third region 1513 and may be disposed on the rear surface of the mobile terminal 100, and more particularly, to the second frame 102, i.e., the rear surface of the third rear part 1022 thereof. Namely, the second region 1512 may be coupled not to the second frame 102 directly but to the third frame 103. As illustrated in FIG. 4 (b), a slot 1025 extending in a lateral direction (i.e., a direction vertical to the length direction of the mobile terminal 100) is formed in the second frame 102, i.e., the third rear part 1022, and the third frame 103 may move along the slot 1025. Although FIG. 4 (b) illustrates that the slot 1025 is formed on the rear surface of the second frame 102, the slot 1025 may be formed on a lateral surface of the second frame 102. The second region 1512 may move in the first or second direction D1 or D2 against the second frame 102 together with the third frame 103, but the movement of the second region 1512 may be restricted within the rear surface of the mobile terminal 100 by the slot 1025. Namely, the second region 1512 does not move out of the second frame 102 despite that the second frame 102 is extended or contracted but may move within the second frame 102 along the slot 1025 by the extended or contracted distance. Therefore, the second region 1512 may be always exposed on the rear surface of the mobile terminal 100.

Eventually, as the first region 1511 may be disposed on the front surface of the mobile terminal 100 so as to be always exposed on the front surface irrespective of the movement of the second frame 102, and the second region 1512 may be disposed on the rear surface of the mobile terminal 100 so as to be always exposed on the rear surface irrespective of the movement of the second frame 102. The third region 1513 is disposed between the first and second regions 1511 and 1512, thereby being selectively disposed on the front surface or rear surface of the mobile terminal 100 according to the moving direction D1/D2 of the second frame 102. According to the selective disposition of the third region 1513, as illustrated in FIG. 4(b), the second rear part 1013 of the first frame 101 is covered by the second and third regions 1512 and 1513 of the display unit 151 and the third rear part 1022 in the first state. Yet, in the second state, as the third region 1513 is moved to the front surface of the mobile terminal 100, the third rear part 1022 is moved in the first direction D1 as well, thereby being possibly exposed out of the mobile terminal 100. Moreover, the second front part 1021 of the second frame 102 is disposed below the first front part 1011 of the first frame 101 in the first state but may be moved out of the first frame 101 in the second state so as to support the third region 1513 of the display unit 151 disposed on the front surface of the mobile terminal 100.

As the first region 1511 and the second region 1512 are always disposed on the front surface and the rear surface of the mobile terminal 100, respectively, the curvatures of the first and second regions 1511 and 1512 may maintain the flat basic state without variation. Yet, the third region 1513 may be bent or folder by being rolled around the roller 1028 within the second frame 102. When the first state is switched to the second state, the third region 1513 may be enlarged to the front surface of the mobile terminal 100 from the second frame 102 by being rolled around the roller 1028 in a predetermined direction. On the contrary, when the second state is switched to the first state, the third region 1513 may be contracted into the second frame 102 from the front surface of the mobile terminal 100 by being rolled around the roller 1028 in a reverse direction and return to the rear surface of the mobile terminal 100 from the second frame 102 simultaneously. Since only a specific portion of a foldable mobile terminal unfolded like a book is folded repeatedly, the specific portion is vulnerable to breakage. On the other hand, a deformed portion of the flexible display unit 151, i.e., the portion rolled around the roller 1028 is variable according to the first or second state of the mobile terminal 100, i.e., the movement of the second frame 102. Therefore, the mobile terminal 100 of the present disclosure may considerably reduce the deformation and fatigue applied repeatedly to the specific portion of the display unit 151, thereby preventing the breakage or damage of the display unit 151.

Based on the aforementioned configuration, the overall operation of the mobile terminal 100 is described as follows. For example, a state switching may be performed manually by a user, and an operation of the mobile terminal 100 during the manual state switching is described. Yet, operations of the first to third frames 101 to 103 and the display unit 151 may be identically performed in case of using a power source other than a user's force, i.e., in case of applying the driving unit 200 described later.

As illustrated in FIG. 3(*a*), FIG. 4(*a*) and FIG. 5(*a*), in the first state, the second frame 102 is fully contracted or retracted into the first frame 101. Therefore, only the first region 1511 of the display unit 151 fixed to the front surface of the first frame 101 may be exposed on the front surface of the mobile terminal 100. The first region 1511 may be fixed to and supported by the first frame 101, i.e., the first front part 1011 thereof. The third region 1513 may be disposed on the rear surface of the mobile terminal 100 together with the second region 1512 mostly and disposed within the second frame 102 in a state of being rolled around the roller 1028 in part. The third region 1513 of the rear surface of the mobile terminal 100 may be supported by the second frame, i.e., the third rear part 1022 1022 thereof. The second region 1512 may be fixed by the third frame 103 disposed on the second frame 1022 (i.e., the third rear part 1022) and movably coupled to the second frame 102.

In such a first state, if the second frame 102 is moved in the first direction D1, the mobile terminal 100 may switch to the second state. As illustrated in FIG. 3(*b*), FIG. 4(*b*) and FIG. 5(*b*), the second frame 102 is extended from the first frame 101 by the movement in the first direction D1 and may increase an overall size of the mobile terminal 100, and more particularly, the front surface thereof. During the movement in the first direction D1, the second frame 102 may apply a force, i.e., tension to the display unit 151 in the first direction D1. As the display unit 151 is fixed to the first frame 101 but movably coupled to the second frame 102 using the third frame 103, the third region 1513 may be rolled out of the roller 1028 of the second frame 102 to the front surface of the mobile terminal 100 by the force applied by the second fame 102. Namely, the third region 1513 may be withdrawn (or pulled out), extend or move out from the second frame 102. Simultaneously, a portion disposed on the third region 1513, and more particularly, on the rear surface of the mobile terminal 100 may be rolled into the roller 1028 of the second frame 102 or inserted (or pushed), retracted or moved in the second frame 102. The third region 1513 is not fully withdrawn from the second frame 102 to the front surface of the mobile terminal 100, and a portion of the third region 1513 may be disposed in the second frame 102 in a state of being still rolled around the roller 1028. Moreover, for such a smooth movement of the third region 1513, the second region 1512 may move in the first direction D1 against the second frame 102 together with the third frame 103. Moreover, as described above, the second region 1512 and the third frame 103 may relatively move in the first direction D1 against the first frame 101 together with the second frame 102 by being restrained by the second frame 102. Therefore, the second region 1512 and the third frame 103 may move relatively in the first direction D1 not only for the second frame 102 but also for the first frame 101, thereby being capable of moving a distance longer than a moving distance of the second frame 102. Therefore, for the long movement of the second region 1512 in the first direction D1, the third region 1513 may be smoothly extended to the front surface of the mobile terminal 100. For the movement of the third region 1513 in proportion to the extension of the second frame 102, the movement of the second region 1512 and the third frame 103 in the first direction D1 may be performed simultaneously with the movement of the third region 1512 and the second frame 102 in the first direction D1 so as to be proportional to the movement of the third region 1513 and the second frame 102.

Once the second frame 102 is fully extended in the first direction D1, the first and third regions 1511 and 1513 are disposed on the front surface of the mobile terminal 100 and only the second region 1512 may be disposed on the rear surface of the mobile terminal 100. The first and third regions 1511 and 1513 may be supported by the first frame (i.e., the first front part 1011 thereof) and the second frame (i.e., the second front part 1021 thereof). As the second frame 102, i.e., the third rear part 1033 thereof is extended in the first direction D1, they may expose the second rear part 1013 of the first frame 101 support the moving third region 1513. Therefore, in the second state, the mobile terminal 100 may have the enlarged front display unit 151.

On the other hand, if the second frame 102 is moved in the second direction D2 in the second state, the mobile terminal 100 may return to the first state as illustrated in FIG. 3(*a*), FIG. 4(*a*) and FIG. 5(*a*). The second frame 102 is retracted into the first frame 101 by the movement in the second direction D2, thereby reducing the overall size of the mobile terminal 100, and particularly, the front surface thereof. The movement of the display unit 151 during the movement of the second frame 102 may be performed in reverse order of the aforementioned movement in the first direction D1. Schematically, the third region 1513 may be rolled into the roller 1028 of the second frame 102 from the front surface of the mobile terminal 100 or inserted/retracted/moved in the second frame 102. Simultaneously, the third region 1513 may be rolled out of the roller 1028 of the second frame 102 or withdrawn/extended/moved out of the roller 1028 of the second frame 102 to the rear surface of the mobile terminal 100. The third region 1513 is not fully withdrawn from the second frame 102 to the rear surface of the mobile terminal 100, and a portion of the third region 1513 may be disposed in the second frame 102 in a state of being still rolled around the roller 1028. Moreover, for such a smooth movement of the third region 1513, the second region 1512 may move in the second direction D2 against the second frame 102 together with the third frame 103, and the second region 1512 and the third frame 103 may relatively move in the second direction D2 against the first frame 101 together with the second frame 102 by being restrained by the second frame 102. Therefore, the second region 1512 and the third frame 103 may move relatively in the second direction D2 not only for the second frame 102 but also for the first frame 101, thereby being capable of moving a distance longer than a moving distance of the second frame 102. For the long movement of the second region 1512, the third region 1513 may smoothly return to the rear surface of the mobile terminal 100. Moreover, for the movement of the third region 1513 in proportion to the retraction of the second frame 102, the movement of the second region 1512 and the third frame 103 in the second direction D2 may be performed simultaneously with the movement of the third region 1512 and the second frame 102 in the second direction D2 so as to be proportional to the movement of the third region 1513 and the second frame 102. If the second frame 102 is fully retracted in the second direction D2, the mobile terminal 100 may switch to the first state mentioned in the foregoing description and have the front display unit 151, which is relatively reduced smaller than that the second state, in the first state.

Figure 6:
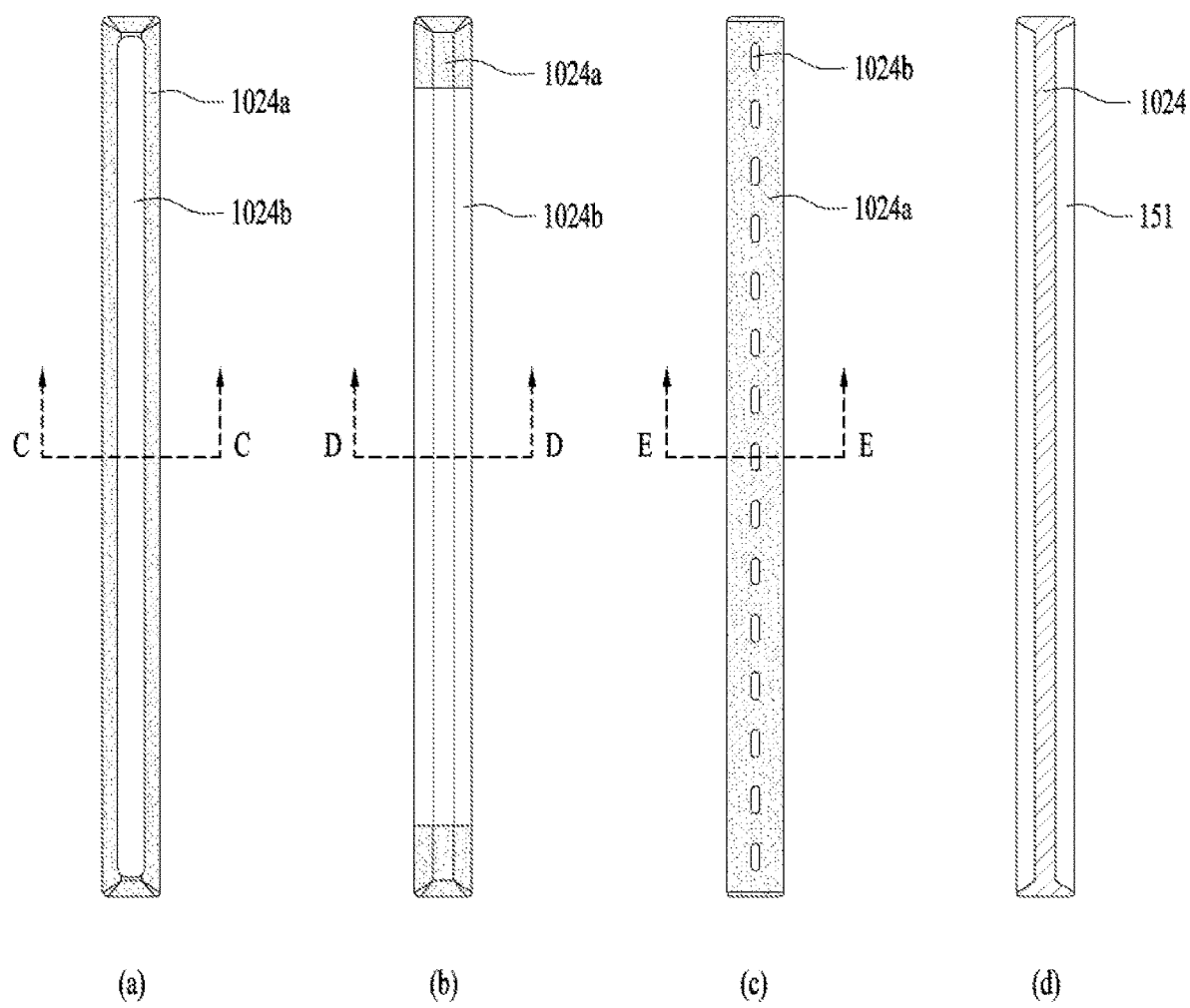
FIG. 6 is a view illustrating various embodiments of a side frame of the mobile terminal.
Figure 7:
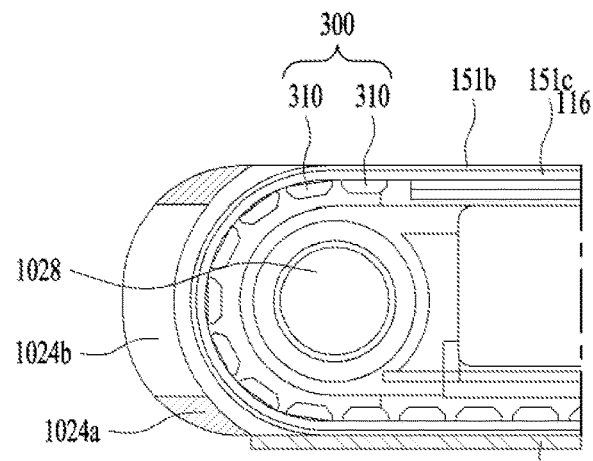
FIG. 7 is a sectional view illustrating side frames, taken along lines C-C, D-D and E-E of FIG. 6.
Figure 7:
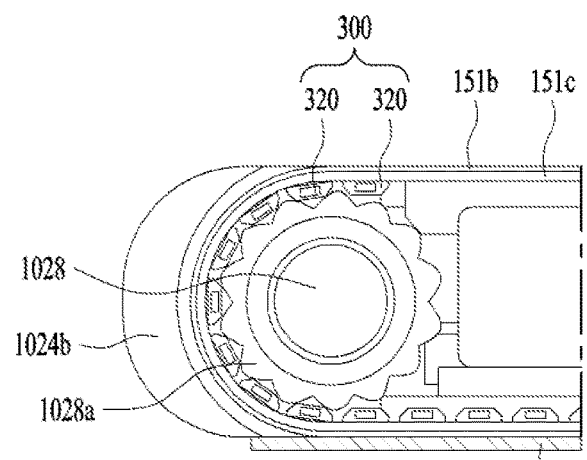
Figure 7:
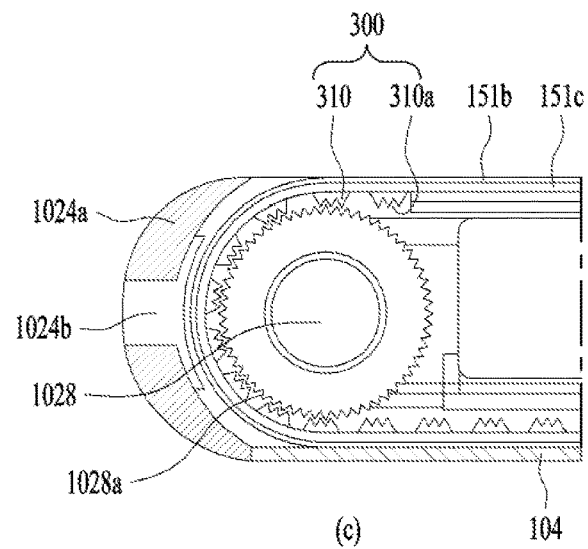

Meanwhile, in the mobile terminal 100 according to the preset disclosure, the side frame 1024 may have various configurations to perform various functions. FIG. 6 is a view illustrating various embodiments of a side frame of a mobile terminal, and FIG. 7 is a sectional view illustrating side frames and adjacent components, obtained along the cutting lines C-C, D-D and E-E of FIG. 6, respectively. The side frame 1024 and the components adjacent thereto are described in detail with reference to the accompanying drawings as follows.

First of all, the side frame 1024 may include a non-transparent or transparent material or be configured in a manner of mixing a non-transparent and a transparent material together. As illustrated in FIG. 6(*a*), the side frame 1024 includes a transparent part 1024*b* in the middle of a non-transparent part 1024*a*, thereby forming a window through which the display unit 151 rolled around the roller 1038 1038 is exposed. As illustrated in FIG. 6 (*b*), the side frame 1024 has a further enlarged region of a transparent part 1024*b*, thereby enlarging the exposed display unit 151. Through the transparent part 1024*b*, an image or text outputted from the flexible display unit 151 is viewable.

A user input may be performed on a lateral side using a touch sensor of the flexible display unit 151. For a touch input, the side frame 1024 may include a conductive material. By forming a protrusion at a conductive material contained portion, a user may touch the protrusion to input a user command.

An inner side of the side frame 1024 corresponding to a curvature of the flexible display unit 151 rolled around the roller 1028 is formed to have a thicker middle portion, thereby securing rigidity with a natural curved surface.

As illustrated in FIG. 6(*c*), a transparent part 1024*b* of a predetermined pattern is configured, thereby providing a user with notification by driving the flexible display unit 151. For example, if there is an incoming call, the flexible display unit 151 may be driven to emit light sequentially.

If there is a notification push of a message or application, notification may be provided in a manner of projecting a light in specific color from the flexible display unit 151 rolled around the roller 1028. Therefore, notification may be provided to a user using the flexible display unit 151 without the separate optical output unit 154. In this case, the transparent part 1024*b* may obtain an effect of spreading light delicately using a semi-transparent material instead of a fully-transparent material.

As illustrated in FIG. 6(*d*), a terminal may be implemented in a manner that a thickness-directional width of a region of a side frame 1024 is narrowed to provide an edge region extended to a predetermined region in a lateral direction to an end of the display unit 151.

The side frame 1024 prevents a breakage problem caused when a face of the flexible display unit 151 folded by an out-folding scheme is exposed externally, whereby durability of the mobile terminal 100 may be enhanced.

FIG. 7 illustrates configurations of the roller 1028 and the flexible display unit 151 as well as the side frame 1024. The flexible display unit 151 of the preset disclosure may include a display panel 151*b* outputting a video and a back plate 151*c* supporting a rear surface of the display panel 151*b*.

The display panel 151*b* is a flexible video display device and may include an Organic Light Emitting Diode (OLED). The back plate 151*c* may use a metal plate provided to the rear surface of the display panel 151 with rigidity to support the display panel 151*b*. If the display panel 151*b* is bent, the metal plate may be bent together with the display panel 151*b*.

The back plate 151*c* and the display panel 151*b* may be attached to each other using an adhesive member. And, the adhesive member may use a double-sided tape such as OCA flexible within a predetermined range like a foam material. Hence, the adhesive member can offset the slip effect due to a curvature radius difference between the back plate 151*c* and the display panel 151*b*.

In order to achieve the natural folding when the third region 1513 is deformed, a groove elongated in the third direction, i.e., the length direction of the mobile terminal 100 may be formed on a surface of a region of the back plate 151*c* corresponding to the third region 1513. Namely, such a groove may be elongated in a straight line between top and bottom ends of the back plate 151*c*.

Although the back plate 151*c* has the rigidity, it is unable to completely prevent the droop of the display unit 151. Hence, the display unit 151 may further include a support frame 300 located on a region corresponding to the third region 1513 thereof.

The support frame 300 may include a plurality of support bars 310 elongated in the third direction, i.e., the length direction of the mobile terminal 100. The support bar 310 may be continuously elongated between the top and bottom ends of the display unit 151. The support bars 310 may be spaced apart from each other in a predetermined distance along the length direction of the display unit 151. As the support bars 310 are not formed wide, they may support the rear surface of the flexible display unit 151 without interrupting the bending deformation of the flexible display unit 151. Particularly, in order to avoid the interference between the support bars 310 in case of folding the display unit 151, each of the support bars 310 may have a trapezoidal or trigonal cross-section so that a size of a portion attached to the back plate 151*c* is smaller than that of an opposite side.

The support bar 310 may be formed by plastic injection molding. If necessary, as illustrated in FIG. 7 (*b*), the rigidity of the support frame 300 may be reinforced by embedding a rigid bar 320 of a metal material in the support bar 310.

The thickness of the support frame 300 may be formed to correspond to that of the first front part 1011 of the first frame 101. As illustrated in FIG. 5 (*b*), the second front part 1021 used to be located inside the first front part 1011 in the first state is located on the rear surface of the third region 1513 of the flexible display unit 151 in the second state. Since a separation space amounting to the thickness of the first front part 1011 is formed between the second front part 1021 and the display unit 151, i.e., the back plate 151*c*, it causes a problem that the third region 1513 of the flexible display unit 151 droops.

The support frame 300 fills the separation space between the second front part 1021 and the display unit 151, i.e., the back plate 151*c* and supports the third region 1513 of the flexible display unit 151. Preferably, the thickness of the support frame 230 may have the thickness corresponding to the separation space between the second front part 1021 and the back plate 151*c*, i.e., the thickness of the first front part 1011. Moreover, as illustrated in FIG. 5(*a*), a separation due to the thickness of the third frame 103 may be generated between the second frame, i.e., the third rear part 1022 thereof and the display unit 151. The support frame 300 may fill such separation as well, thereby supporting the third region 1513 more stably. To perform such a function, as described above, the support frame may be provided to the third region 1513, and more particularly, to the rear surface of the third region 1513 only.

In case that the support frame 300 has sufficient rigidity, the second front part 1021 of the second frame 102 may be skipped. In this case, the corresponding thickness may be set irrespective of the first front part 1011 of the first frame 101.

The roller 1028 may have various structures to enable the flexible display unit 151 to be rolled around the roller 1028 by contacting with a surface of the support frame 200 without being moved back. For example, as illustrated in FIG. 7 (b), the roller 1028 may include a gear disposed on a circumferential surface thereof and engaged between the support bars 310. On the other hand, as illustrated in FIG. 7 (c), a first sawtooth may be formed on a surface of the roller 1028 and a second sawtooth 310a engaging with the first sawtooth 1028a may be formed on a surface of the support frame 300 as well.

As illustrated in FIGS. 7(a) to 7(c), a rear cover 104 covering the rear surface of the mobile terminal 100 may be further included. As at least one portion of the rear cover 104 is transparent, a video outputted from the flexible display unit 151 located on the rear surface can be checked. A portion of the rear cover 104 covering the first rear part 1012 may be formed transparent to correspond to the camera 121, the flash and the like at least.

The rear cover 104 may be coupled to the first frame 101 and cover it substantially by being directly coupled on the first rear part 1012. The rear cover 104 may not be coupled to the third rear part 1022 of the second frame 102, the third frame 103 and the flexible display unit 151 but may simply cover them. To this end, the rear cover 104 may be spaced apart from the second rear part 1013 by the total thickness of the third rear part 1022 of the second frame 102, the third frame 103 and the flexible display unit 151. In order not to interrupt the movement of the flexible display unit 151 and to prevent the breakage of the display unit 151, the rear cover 104 may be configured not to contact with the display unit 151. If the mobile terminal 100 is in the first state, the rear cover 104 may cover the flexible display unit 151. If the mobile terminal 100 is in the second state, the rear cover 104 may cover and protect the second rear part 1013 exposed by the movement of the flexible display unit 151 and the third rear part 1022.

The rear cover 104 may be coupled to the second frame 102. In this case, in the first state, the rear cover 104 may cover the entire rear surface of the mobile terminal 100, i.e., the first rear part 1012 and the display unit 151. In the second state, the rear cover 104 moves together with the second frame 102 and may cover the third rear part 1022 of the second frame 102 exposed by the movement of the display unit 151 and the second region 1512 of the flexible display unit 151 coupled to the third frame 103.

Meanwhile, when the flexible display unit 151 is enlarged in a manner that a user manually moves the second frame 102, the flexible display unit 151 may be twisted or the first or second frame 101 or 102 may be broken or damaged due to a force applied non-uniformly. Therefore, the mobile terminal 100 of the present disclosure may include a driving unit 200 configured to uniformly apply a force to the second frame 102 for movement. The driving unit 200 may move the second frame 102 in a manner of applying a force to the second frame 102 automatically according to a user's instruction or a predetermined condition.

Figure 8:
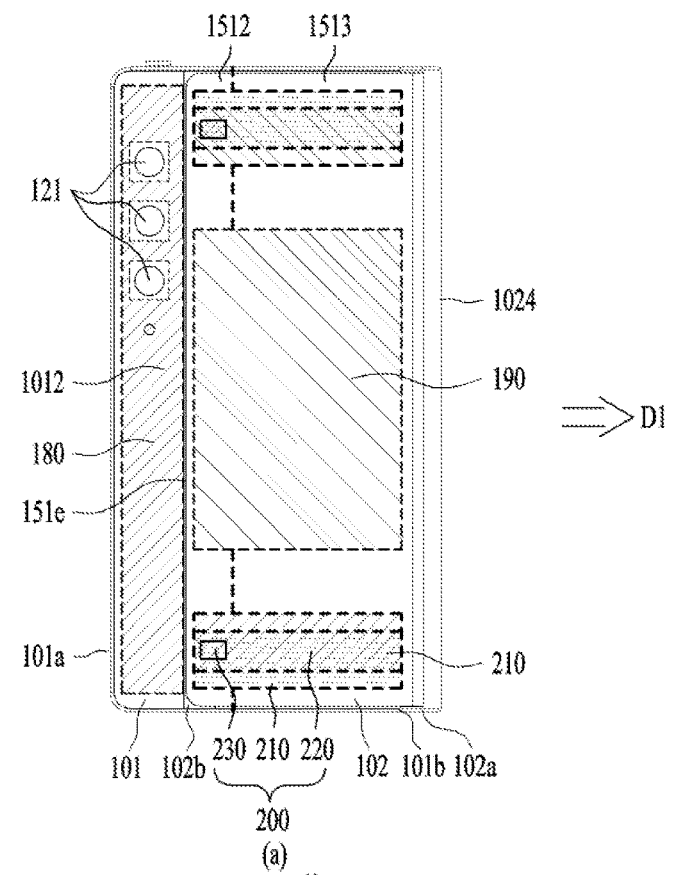
FIG. 8 is a rear view illustrating an operation of a driving unit and the first and second states of the mobile terminal achieved by the operation.
Figure 8:
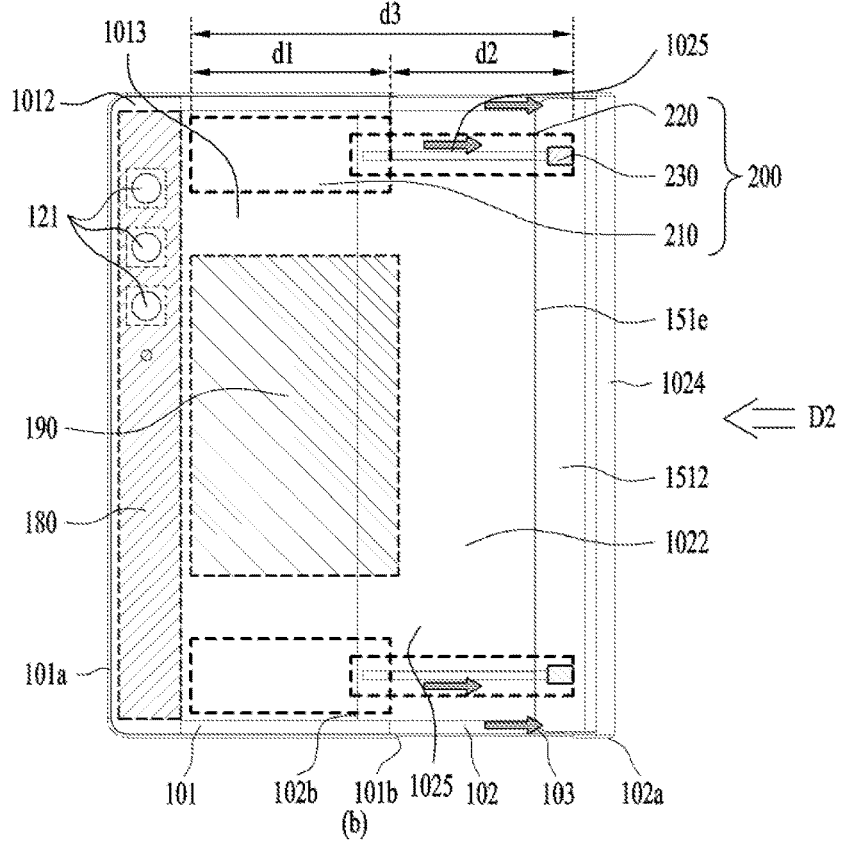

The driving unit 200 is described in detail with reference to the relevant drawing as follows. FIG. 8 is a rear view illustrating an operation of a driving unit and first and second states of a mobile terminal implemented by the operation.

An operation principle of the driving unit 200 is described first with reference to FIG. 8.

The driving unit 200 may be configured to move the second frame 102 relatively to the first frame 101 or move the third frame 103 relatively to the second frame 102. In particular, the driving unit 200 may move the second frame 102 in the first direction D1 against the first frame 101 and move the third frame 103 in the first direction D1 against the second frame 102. By the movement in the first direction D1, as described above, the mobile terminal 100 is switched to the second state from the first state. And, by the movement of the display unit 151 to the front surface of the mobile terminal 100, the mobile terminal 100 may secure an enlarged front display region. Alternatively, the driving unit 200 may move the second frame 102 in the second direction D2 opposite to the first direction D1 against the first frame and move the third frame 103 in the same second direction D2. By the movement in the second direction D2, as described above, the mobile terminal 100 is switched to the first state from the second state. And, by the movement of the display unit 151 to the rear surface of the mobile terminal 100, the mobile terminal 100 may return to have a reduced front display region. Besides such basic movements, the driving unit 200 may be configured to perform all movements of the second and third frames 102 and 103 and the display unit 151 linked to them, which are required for the aforementioned state switching of the mobile terminal 100.

As schematically illustrated in FIG. 8, in order for the mobile terminal 100 to enter the second state, the second frame 102 may be moved in the first direction D1 by a first distance d1 preset for the first frame 101. Since the third frame 103, i.e., the second region 1512 is coupled to the second frame 102, it may basically move in the first direction D1 by the first distance d1 against the first frame 101 together with the second frame 102. By such a movement of the second frame 102, the front surface of the mobile terminal 100 may be extended in the first direction D1 by a second distance d2 equal to the first distance d1. Hence, in order to move the display unit 151, and particularly, the third region 1513 to the front surface of the mobile terminal 100 by the extended second distance d2, as illustrated in the drawing, the third frame 103 should further move in the first direction D1 against the second frame by the second distance d2 equal to the first distance d1 additionally. Hence, the display unit 151, i.e., the third frame 103 may move in the first direction D1 by a third distance d3 amounting to a double of the first distance d1 that is the moving distance of the second frame 102. On the other hand, in order to make the mobile terminal 100 to return to the first state, the second and third frames 102 and 103 may move in a manner opposite to the former description. Schematically, the second frame 102 moves in the second direction D2 against the first frame 101 by the first distance d1, and the third frame 103 may move in the second direction D2 against the second frame 102 by the second distance d2 in addition to the movement by the first distance d1 against the first frame 101. Hence, for the switching to the first state, the display unit 151, i.e., the third frame 103 may move in the second direction D1 by the third distance d3 amounting to the double of the first distance d1 that is the moving distance of the second frame 102. For that reason, the driving unit 200 may be configured to move the third frame 103 against the first frame 101 as well as the second frame 102, thereby moving the third frame 103 by the aforementioned long distance, i.e., the third distance d3.

While the front surface of the mobile terminal 100 is increased or decreased by the movement of the second frame 102, if the display unit 151 fails to move in proportion to such increase or decrease of the front surface, the enlargement or reduction of the display unit 151 on the front surface of the mobile terminal 100 may not be smoothly performed. For that reason, the driving unit 200 may be configured to synchronize the movement, i.e., slide of the third frame 103 with the movement, i.e., slide of the second frame 102. Particularly, the driving unit 200 may be configured to synchronize a timing of starting the movement of the third frame 103 with a timing of starting the movement of the second frame 102. Namely, the driving unit 200 may be configured to make the third and second frames 103 and 102 start to move simultaneously. The simultaneous movements of the second and third frames 102 and 103 may start at the same location on the mobile terminal 100. Namely, the driving unit 200 may synchronize a location of starting the movement of the third frame 103 with a location of starting the movement of the second frame 102. Together with the synchronizations of the movement start timing and the movement start locations, the driving unit 200 may be configured to synchronize a moving speed of the third frame 103 with a moving speed of the second frame 102. Hence, the driving unit 200 may simultaneously move the second and third frames 102 and 103 from the same location within the same time by the same distance (i.e., the first distance d1 against the first frame 101 in case of the second frame 102, the second distance d2 against the first frame 102 in case of the third frame 103) against the first and second frames 101 and 102, respectively. Moreover, since the third frame 103 basically moves by the first distance d1 by being carried by the second frame 102, it may move long owing to the above-synchronized movement by the third distance d3 amounting to the sum of the first and second distances d1 and d2 overall by moving in proportion to the moving distance of the second frame 102. For that reason, by the driving unit 200, according to the increase/decrease of the front surface of the mobile terminal 100, the display unit 151 may be smoothly enlarged/reduced on the front surface.

The driving unit 200 is configured to satisfy such requirements. As schematically illustrated in FIG. 8, the driving unit 200 may include a support 210, a first actuator 220 movably coupled to the support 210, and a second actuator 230 movably coupled to the first actuator 220. The first actuator 220 reciprocates on a straight line in predetermined directions, i.e., the first and second directions D1 and D2 against the support 210 and may be configured to move the second frame 102. And, the second actuator 230 reciprocates on a straight line in the first and second directions D1 and D2 against the first actuator 220 and may be configured to move the third frame 103. Namely, the driving unit 200 has the telescopic structure that includes the straight-lined reciprocating first and second actuators 220 and 230 as stages. Through the telescopic structure, the driving unit 200 may be configured to achieve the required moving distances of the second and third frames 102 and 103. Moreover, the driving unit 200 may be configured to synchronize the movement of the first actuator 220 and the movement of the second actuator 230 together for the synchronization of the movements of the second and third frames 102 and 103. The first and second actuators 220 and 230 of the driving unit 200 provide power to the frames 102 and 103 by linking to the second and third frames 102 and 103 and may perform the movements required for the frames 102 and 103 identically for the aforementioned state switching of the mobile terminal 100. The supporter 210 and the first and second actuators 220 and 230 of the driving unit 200 may have various configurations for the intended functions described above. In addition, the driving unit 200 may be different in structure from the supporter 210 and the first and second actuators 220 and 230 to perform the above-described functions.

Meanwhile, as described above, the mobile terminal 100 may relatively move the display 151 using the driving unit 200 with respect to the related frames. Accordingly, the mobile terminal 100 may be configured in a manner that the size of the display unit 151 disposed at the front surface of the mobile terminal (i.e., the size of the screen disposed at the front surface of the mobile terminal 100 implemented by the display unit 151) can be adjusted and the states (i.e., first and second states) of the mobile terminal 100 can be switched. Accordingly, the size of the front screen of the mobile terminal 100 may be determined by the movement distance (i.e., the movement amount) of the display unit 151 (precisely, the third region 1513). In addition, as described above with reference to FIG. 8, the mobile terminal 100 may move related frames, particularly the second frame 200, using the driving unit 200 so as to move the display unit 151. More specifically, in order to switch the mobile terminal 100 to the second or first state, the second frame 102 may move to the first or second direction D1 or D2 by a first distance d1 predetermined between the first and second points A1 and A2. That is, in order to actually move the display unit 151 as well as to switch the state of the mobile terminal 100, the second frame 102 may perform a stroke in which the second frame 102 reciprocates between the stroke start point A1 and the stroke end point A2 corresponding to a predetermined stroke distance (d1). Accordingly, the movement amount (i.e., the movement distance) of the display unit 151 (or the third region thereof) may be determined by the movement amount (i.e., the movement distance) of the second frame 102 during the stroke of the second frame 102. Here, the movement amount of the second frame 102 moving in the first direction D1 may refer to the movement distance from the stroke start point A1 to the stroke end point A2. The movement amount of the second frame 102 moving in the second direction D2 may refer to the movement distance from the stroke end point A2 to the stroke start point A1. In addition, the amount of movement (i.e., the movement distance) of the second frame 102 may have a direct correlation with the position at which the second frame 102 is disposed in the mobile terminal 100. For this reason, in order to properly control the overall operation of the mobile terminal 100 as well as to adjust the size of the front screen, the mobile terminal 100 may include the detection device 400 that detects the amount of movement (i.e., the movement distance) of the second frame 102 moving in the first and second directions D1 and D2 as well as the position of the second frame 102 and then performs the detection function.

Figure 9:
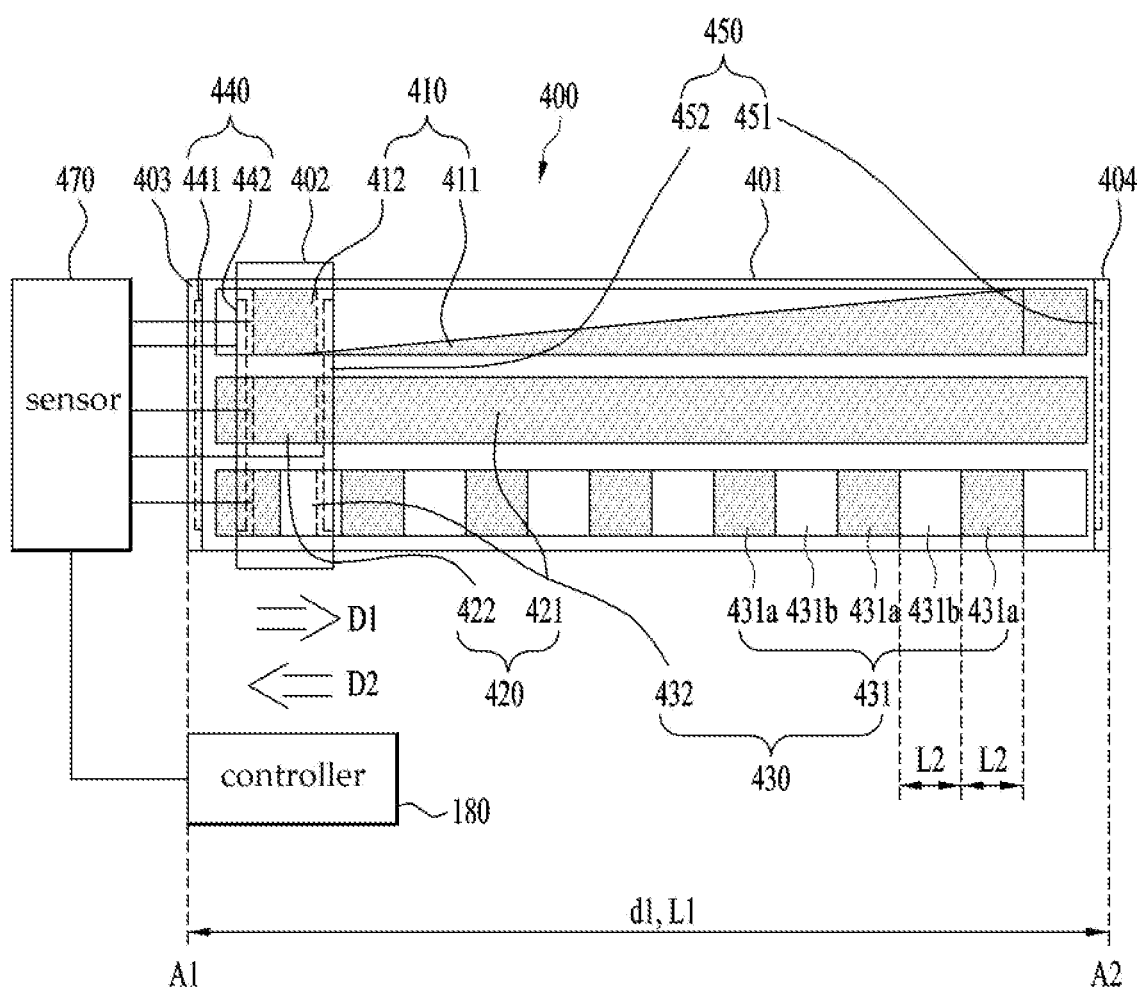
FIG. 9 is a plan view illustrating a detection device for detecting the amount of movement of a second frame in the mobile terminal according to the present disclosure.
Figure 10:
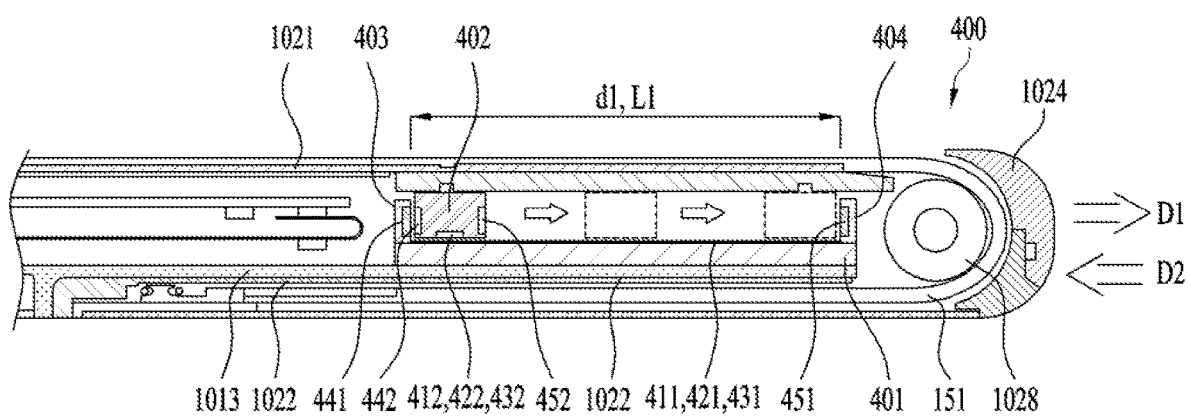
FIG. 10 is a cross-sectional view taken along the line A-A of FIG. 3 showing the detection device.
Figure 11:
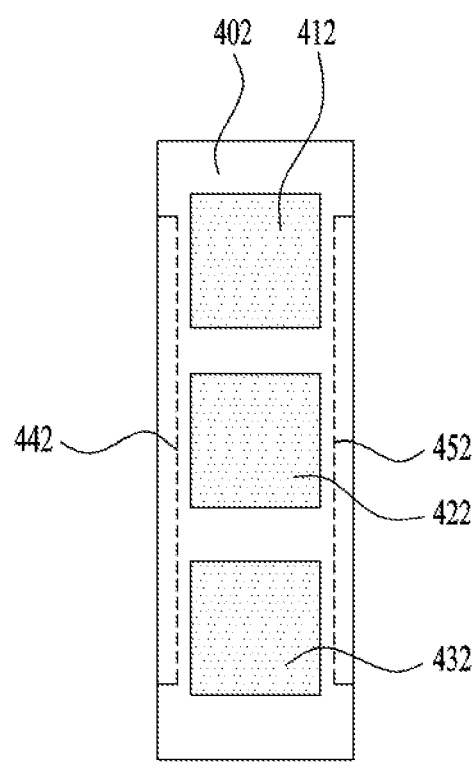
FIG. 11 is a plan view illustrating second, fourth, and sixth conductors of first to third capacitors of the detection device.
Figure 12:
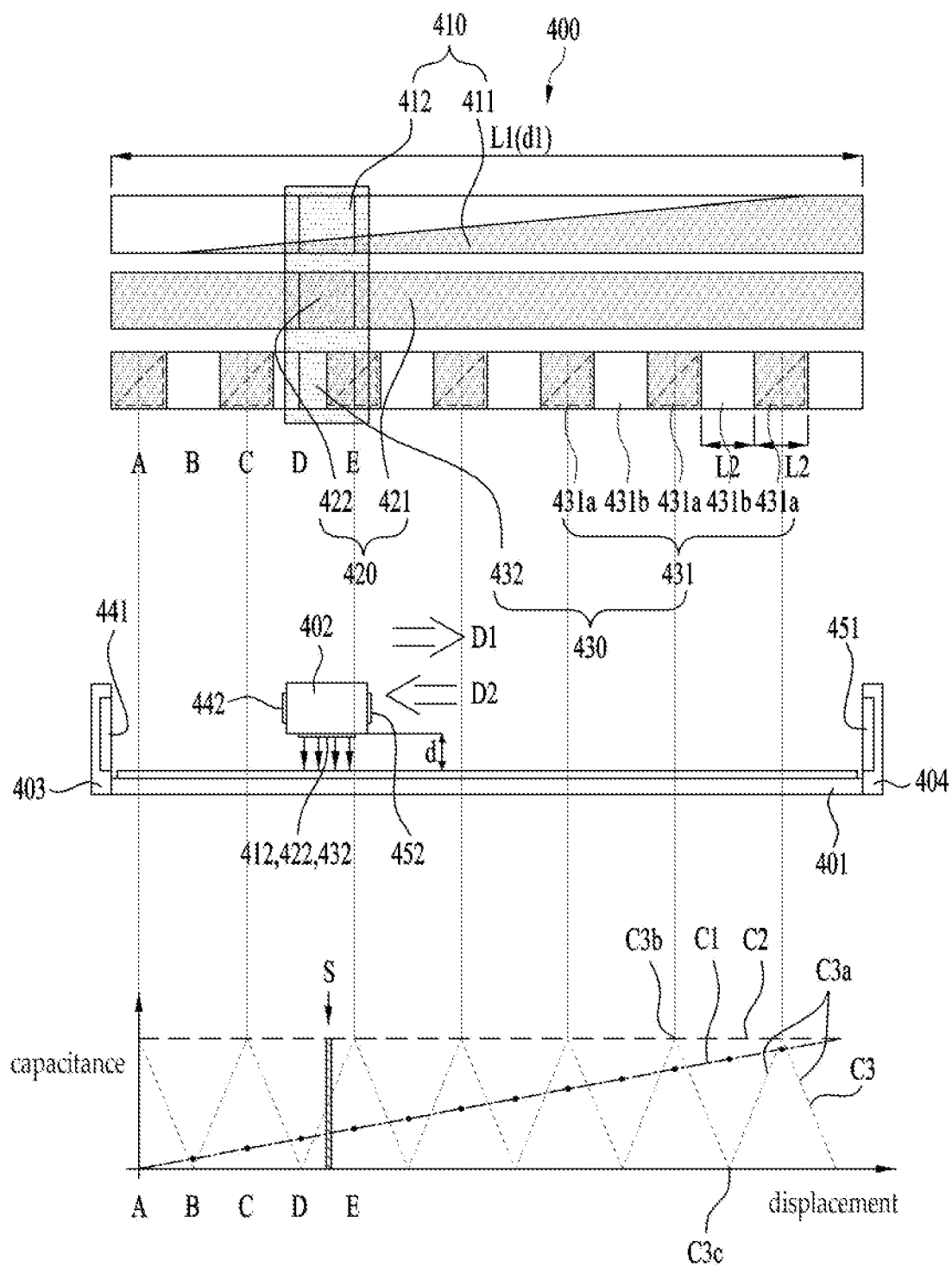
FIG. 12 is a schematic diagram illustrating the relationship between the capacitances measured by the first to third capacitors of the detection device and the movement amounts of the second frame.

FIG. 9 is a plan view illustrating a detection device for detecting the amount of movement of the second frame in the mobile terminal according to the present disclosure. FIG. 10 is a cross-sectional view taken along the line A-A of FIG. 3 showing the detection device. FIG. 11 is a plan view illustrating second, fourth, and sixth conductors of first to third capacitors of the detection device. FIG. 12 is a schematic diagram illustrating the relationship between the capacitances measured by the first to third capacitors of the detection device and the movement amounts of the second frame. A detection mechanism 400 will hereinafter be described in detail with reference to the attached drawings.

Various methods may be used to detect the position and movement amount of the second frame 102. The detection mechanism 400 from among the above-described methods is one example capable of using the mechanism configured to use capacitor(s). The capacitor may be an electrical component for storing capacitance as electric energy. The capacitance (C) may be defined as follows when the capacitor is composed of a pair of conductors facing each other.

$$C = \varepsilon \frac{A}{d}$$

In the above equation, 'A' denotes an overlap area where the conductors overlap each other, 'd' denotes the distance between the conductors, and 'ε' denotes permittivity.

As can be seen from the above-described equation, the capacitance (C) of two conductors corresponding to one pair of facing conductors may be proportional to the area where the conductors face each other (i.e., the overlap area of the facing conductors, hereinafter referred to as "overlap area"). If one of the two conductors corresponding to one pair of conductors moves relative to the other one, the overlap area may be changed in response to the movement of the selected conductor, such that the capacitance may also be changed in response to such change in the overlap area. That is, the change in capacitance may indicate the position and movement amount of the moving conductor. Accordingly, the detection device 400 may be configured to measure the change in capacitance generated in capacitors provided to constituent components (e.g., the first and second frames 101 and 102) of the mobile terminal 100 configured to perform relative movement according to the movement of the second frame 102. The capacitor may include conductors that are respectively disposed in the first and second frames 101 and 102 to face each other. In order to change capacitance, the conductors may be configured to have an overlap area that is changed while the second frame 102 moves relative to the first frame 101. For example, when any one conductor of the capacitors is installed in the moving second frame 102 and the other conductor is installed in another constituent element (e.g., the first frame 101) of the mobile terminal 100 that is relatively stationary, these conductors may generate capacitance that is changed during the movement of the second frame 102, and the position and the movement amount of the second frame 102 may be determined using the changed capacitance.

The controller 180 may be configured to operate in conjunction with the detection device 400 to control the mobile terminal 100. That is, the controller 180 may process the amount of movement (i.e., the change in capacitance) of the second frame 102 detected by the detection device 400, and may apply the processed movement amount to the control of the mobile terminal 100. As described above, the controller 180 may include a processor and associated electronic components, and may be electrically connected to various components and devices included in the mobile terminal 100. Accordingly, the controller 180 can control the overall operation of the mobile terminal 100 by controlling the internal components and devices of the mobile terminal 100, and may be referred to by a variety of names such as a controller, a processor, and the like. Accordingly, operations and functions described in relation to the detection device 400 are performed in conjunction with the controller 180, so that the operations and functions may become characteristics of the controller 180. For this reason, although not described as being performed by the controller 180, the following detailed related features, operations, and functions may all be understood as features of the controller 180.

The controller 180 may more accurately determine the actual movement amount and position of the second frame 102 using the amount of movement (i.e., change in capacitance) of the second frame 102 detected by the detection device 400. In addition, the controller 180 may determine the movement amount of the display unit 105 (i.e., the third region 1513) and the size of a front screen of the mobile terminal based on the amount of movement of the second frame 102. The controller 180 may adjust the type/size of the content and a user experience (UX)/user interface (UI) according to the determined screen size. Alternatively, based on the determined position or movement amount of the second frame 102, the controller may control the driving unit 200 and the related movement amount of the second frame 102 so as to form the size of content to be provided and the screen size suitable for the UX/UI. Furthermore, the controller 180 may perform control for various other operations based on the detected movement amount of the second frame 102.

In more detail, the capacitors 410 to 450 of the detection device 400 to be described later may be directly mounted to constituent components (e.g., the first and second frames 101 and 102) which relatively move with respect to the mobile terminal 100. Nevertheless, for more stable mounting, the detection device 400 may include mounters 401 to 404 for mounting the capacitors 410 to 450 to the mobile terminal 100, as shown in FIGS. 9 to 12. As an example of such mounters, the detection device 400 may include a first platform 401 installed in the first frame 101. In addition, the detection device 400 may include, for example, a second platform 402 installed in the second frame 102 that relatively moves with respect to the first frame. The first platform 401 may be disposed on a portion of the first frame 102 facing the second frame 102. For example, the first platform 401 may be disposed on the inner surface of the second rear portion 1013 of the first frame 101. In addition, the second platform 402 may be disposed on a portion of the second frame 102 facing the first frame 101. For example, the second platform 402 may be disposed on the inner surface of the second front portion 1021 of the second frame 102. The capacitors 410 to 450 described below by such arrangement may have pairs of facing conductors 411/412, 421/422, 431/432, 441/442, and 451/452.

For example, some capacitors 410, 420 and 430 in the detection device 400 may respectively include first, third, and fifth conductors 411, 421, and 431 disposed on a top surface of the first frame 101 (i.e., the first platform 401). Each of the first, third, and fifth conductors 411, 421, and 431 may be made of any material having electrical conductivity, and may generally be formed of a thin plate-shaped member. The first, third, and fifth conductors 411, 421, and 431 may be installed on the first platform 401 using various methods, for example, an adhesive or a fixing member. The first, third, and fifth conductors 411, 421 and 431 may extend long in the first or second direction D1 or D2 on the first platform 401. The first, third, and fifth conductors 411, 421 and 431 may be arranged in parallel to each other to be disposed in a narrow inner space of the mobile terminal 100. Specifically, the first, third, and fifth conductors 411, 421 and 431 may be configured to reflect or indicate a stroke of the second frame 102 through this elongated shape. In more detail, as shown in FIG. 9, the first, third, and fifth conductors 411, 421, and 431 may extend from the first point A1 indicating the stroke start point to the second point A2 indicating the stroke end point. Here, the length from the first point A1 to the second point A2 is denoted by the first length L1 corresponding to the stroke distance (d1) of the second frame 102. As can be seen from FIG. 10, although the first, third, and fifth conductors 411, 421, and 431 are shown as being relatively reduced in size for convenience of description, the first, third, and the fifth components shown in FIG. 10 are used to sufficiently describe the first, third, and fifth conductors 411, 421, and 431 while avoiding interference from other surrounding components. In fact, as mentioned above, the above-described components may extend between the first point A1 and the second point A2 by the actual stroke distance (i.e., the first distance d1 or L1) on the first frame 101 of the mobile terminal 100. On the other hand, each of the first, third, and fifth conductors 411, 421, and 431 may have a reduced length as shown in FIG. 10. In this case, the first length L1 of the first, third, and fifth conductors 411, 421, and 431 may be shortened by a predetermined scale from the actual stroke distance (d1), thereby still representing the stroke distance (d1) proportionally. In order to mount the first, third, and fifth conductors 411, 421, and 431 each having the above-described shape, the first platform 401 may also be formed of a plate-shaped member elongated in the first or second direction D1 or D2.

Also, as can be seen from FIG. 11 including the surface (i.e., the bottom surface) of the second platform 401 facing the first platform 401, the capacitors 410, 420, and 430 may respectively include the second, fourth and sixth conductors 412, 422, and 432 disposed on the bottom surface of the second frame (i.e., the second platform 402). In the same manner as in the first, third, and fifth conductors 411, 421, and 431, the second, fourth, and sixth conductors 412, 422, and 432 may be made of any material having electrical conductivity, and may be mounted to the second platform 402 in various ways, for example, using an adhesive or a fixing member. By this arrangement, the second, fourth, and sixth conductors 412, 422, and 432 may be arranged to face the first, third, and fifth conductors 411, 421, and 431, thereby generating the intended capacitance. In addition, while the first, third, and fifth conductors 411, 421, and 431 are relatively stopped together with the first frame 101, the second, fourth, and sixth conductors 412, 422, and 432 may generate capacitance and at the same time may relatively move together with the second frame 102 with respect to the first, third, and fifth conductors 411, 421, and 431 and the first frame 101. As described above, since the first, third, and fifth conductors 411, 421, and 431 are configured to reflect or represent the stroke of the second frame 102, the second, fourth, and sixth conductors 412, 422, and 432 may simply form the capacitors 410 to 430 and may only serve to generate capacitance. In addition, since the second, fourth, and sixth conductors 412, 422, and 432 should move along the first, third and fifth conductors 411, 421, and 431, it is not necessary for the second, fourth, and sixth conductors 412, 422, and 432 to extend along the first, third, and fifth conductors 411, 421, and 431. Therefore, the second, fourth, and sixth conductors 412, 422, and 432 may have the same small size. For example, the second, fourth, and sixth conductors 412, 422, and 432 may be located at a reference position indicating the start and end points of the stroke of the second frame 102, and may have a small size sufficient to accurately indicate the reference position. As shown in FIGS. 9 to 12, each of the second, fourth, and sixth conductors 412, 422, and 432 may be formed of a small square plate-shaped member. The second, fourth, and sixth conductors 412, 422, and 432 may also be disposed in parallel to each other, so that the second, fourth, and sixth conductors 412, 422, and 432 are arranged to face the first, third, and fifth conductors 411, 421, and 431. In order to accommodate and mount the second, fourth, and sixth conductors 412, 422, and 432 having such small size and side-by-side arrangement, the second platform 402 may also be made of a narrow plate-shaped member. The basic configuration of the remaining capacitors 440 and 450 will be described later along with their detailed functions and structures.

In order to sense capacitance in the capacitors 410 to 450, the detection device 400 may include a sensor 470 as shown in FIG. 9. The sensor 470 may be electrically connected to the capacitors 410 to 450 to sense capacitances generated in the capacitors 410 to 450. In more detail, the sensor 470 may be implemented as an electrical circuit capable of detecting capacitance and a change in the capacitance through a change in charges generated in the capacitors 410 to 450. Accordingly, the sensor 470 may be included as a portion of the controller 180 instead of a separate module shown in FIG. 16.

Following the basic configuration described above, the detailed configuration of the detection device 400 will be described below. In the detailed configuration, the functions and structures of the capacitors 410 to 450 will be described in more detail.

First, the detection device 400 may include a first capacitor 410 configured to indicate the absolute position of the second frame 102 within the stroke of the second frame 102. As shown in FIGS. 9 to 12, the first capacitor 410 may include a first frame 101, i.e., a first conductor 411 provided to the first platform 401. In addition, the first capacitor 410 may include the second frame 102, i.e., a second conductor 412 provided to the second platform 402. As described above, the first conductor 411 may extend long in the first or second direction D1 or D2. Actually, the first conductor 411 may extend between the first point A1 indicating the stroke start point and the second point A2 indicating the stroke end point by the first length L1 corresponding to the stroke distance (d1) of the second frame 102. As described above, the second conductor 412 may have a relatively larger size than the first conductor 411 to represent the position of the second frame 102. In addition, the second conductor 412 may be disposed in the second platform 402 to face the first conductor 411 while being spaced apart from the first conductor 411 by a predetermined clearance (d), and may generate a first capacitance (C1) along with the first conductor 411 while moving together with the second frame 412 along the first conductor 411.

More specifically, as shown in FIG. 12, the first capacitor 410 may be configured to generate the first capacitance C1 that is continuously changed while having different values during the stroke of the second frame 102. For the first capacitance C1, the first conductor 411 may be configured to have a shape that is continuously changed over the stroke of the second frame 102 or the stroke distance (d1 or L1) of the second frame 102. As an example, as can be seen from the drawings, the first conductor 411 may have a right-angled triangular shape that is generally formed over the stroke distance (d1 or L1), and may have any shape that is continuously changed. When the second conductor 412 moves along with the second frame 102 on the first conductor 411 within the stroke, the first and second conductors 411 and 412 may form the overlap area that is continuously changed therebetween due to the shape of the first conductor 411. As shown in FIG. 12, the changed overlap areas may generate different first capacitances C1 that continuously vary depending on the stroke distance (d1), and the respective capacitances may represent the absolute and unique position of the second frame 102 within the stroke of the second frame 102. Accordingly, the controller 180 may determine the position and movement amount of the second frame 102 based on the first capacitance (C1) values of different first capacitors 410.

On the other hand, although the detection device 400 can accurately detect the position and movement amount of the second frame 102 using only the first capacitor 410, many factors capable of generating an error in such detection may occur in the actual operation. For example, vibration and wear of the second frame 102 and dimensional tolerance, etc. of the second frame 102 and peripheral components thereof may occur, which may bring about a change in the tolerance (d) between the first conductor 411 and the second conductor 412 in the first capacitor 410 during the movement of the second frame 102. In addition, a local temperature difference and a difference in conductor material may result in a change in permittivity (ε). The change in tolerance (d) and permittivity (ε) may generate an error in the first capacitance C1, thereby generating an error in detecting the position and movement amount of the second frame 102. For this reason, in order to prevent occurrence of such error, the detection device 400 may further include a second capacitor 420 configured to generate the second capacitance C2 that is a predetermined reference capacitance during the stroke of the second frame 102.

As shown in FIGS. 9 to 12, the second capacitor 420 may include a third conductor 421 provided to the first frame 101 (i.e., the first platform 401). In addition, the second capacitor 420 may include a fourth conductor 422 provided to the second frame 102 (i.e., the second platform 402). As described above, the third conductor 421 may extend long in the first or second direction D1 or D2. Actually, the third conductor 421 may extend between the first point A1 and the second point A2 by the first length L1 corresponding to the stroke distance (d1) of the second frame 102. As described above, the fourth conductor 422 may be disposed in the second platform 402 to face the third conductor 421 with a small size representing the position of the second frame 102 while being spaced apart by a predetermined tolerance (d). Accordingly, the fourth conductor 422 may move along with the second frame 412 along the third conductor 421, and may generate the second capacitance C2 together with the third conductor 411.

As shown in FIG. 12, the second capacitor 420 may be configured to generate the second capacitance C2 having a constant value over the entire stroke of the second frame 102. For this second capacitance C2, the third conductor 421 may be configured to have a constant shape over the stroke of the second frame 102 or the stroke distance (d1 or L1) of the second frame 102. That is, since the overlap area between the third conductor 421 and the fourth conductor 421 depends on the shape of the third conductor 421 in the direction perpendicular to the first or second direction D1 or D2, the third conductor 421 may be configured to have a constant shape in the same vertical direction over the entire stroke. As an example, as shown in the drawings, the third conductor 421 may have a rectangle formed over the stroke distance (d1 or L1), and may have any constant shape as defined above. When the fourth conductor 422 moves along with the second frame 102 on the third conductor 421 within the stroke, the third and fourth conductors 421 and 421 may form a constant and equal overlap area therebetween due to the shape of the third conductor 411. This constant overlap area may generate a constant capacitance C2, and this capacitance C2 may act as a reference capacitance for correcting such errors.

More specifically, in order to reduce the errors, the ratio of the first capacitance C1 to the second capacitance C2 can be used to calculate the position and movement amount of the second frame 102, as shown in the following equation.

$$\frac{C1}{C2} = \frac{\varepsilon 1 \frac{A1}{d1}}{\varepsilon 2 \frac{A2}{d2}} = \frac{A1}{A2}$$

As shown in the above equation, the ratio of the first capacitance C1 to the second capacitance C2 may offset the permittivity (ε) and the tolerance (d) that cause such errors, and may be the ratio of the overlap areas of the first and second capacitors 410 and 420 causing no errors. This ratio may more accurately indicate the position and movement amount of the second frame 102 by removing errors. Accordingly, the controller 180 may be configured to determine the position and movement amount of the second frame 102 based on the ratio of the first capacitance C1 to the second capacitance C2 (i.e., the amount of change of the first capacitance C1 with respect to the second capacitance C2 indicating the reference capacitance).

Further, the position and movement amount of the second frame 102 may be expressed and calculated in more detail based on a proportional equation using the above-described ratio. In more detail, when the first capacitor 410 generates the first capacitance C1 at a predetermined movement amount (x) of the second frame 102, the second capacitor 420 may include the entire stroke distance or the first length (d1 or L1) and generate a constant second capacitance C2 at all positions and movement amounts of the second frame 102. This relationship can be represented by the following equation.

$$x:C1 = L1:C2$$

$$\therefore x = L1\frac{C1}{C2}$$

As shown in the above proportional equation, the position and movement amount of the second frame 102 may be represented as a product of the entire stroke distance (or the first length L1 of the first or third conductor 411 or 421) and the ratio of the first capacitance C1 to the second capacitance C2. In the above-described ratio and proportional equation, the second capacitance C2 has any constant value with respect to the first capacitance C1, but in consideration of the proportional relationship as shown in FIG. 19, the second frame 102 may be set to be equal to a maximum value of the first capacitance C1 generated when the second frame 102 moves by the total stroke distance L1.

By using the first and second capacitors 410 and 420 as described above, the controller 180 can accurately detect the position and movement amount of the second frame 102 and can accurately control the mobile terminal 100. However, if the position and movement amount of the second frame 102 are detected more accurately, the accuracy of the control of the mobile terminal 100 can be further improved. Among various methods, the accuracy of the position and movement amount of the second frame 102 may be improved by increasing the resolution of the detection device 400. That is, when the detection device 400 subdivides the entire stroke or the stroke distance (d1, L1) more finely, and detects the position and movement amount of the second frame 102 based on the subdivided stroke distance (d1, L1), the sensitivity of the detection device can be improved so that the position and movement amount of the second frame 102 can be detected more accurately. For this reason, the detection device 400 may further include the third capacitor 430 that subdivides the stroke or the stroke distance (d1, L1) of the second frame 102 and represents the subdivided positions.

As shown in FIGS. 9 to 12, the third capacitor 430 may include a fifth conductor 431 provided to the first frame 101 (i.e., the first platform 401). In addition, the third capacitor 430 may include a sixth conductor 432 provided to the second frame 102 (i.e., the second platform 402). As described above, the fifth conductor 431 may extend long in the first or second direction D1 or D2. Actually, the fifth conductor 431 may extend between the first point A1 and the second point A2 by the first length L1 corresponding to the stroke distance (d1) of the second frame 102. As described above, the sixth conductor 432 may be disposed in the second platform 402 to face the fifth conductor 431 with a small size representing the position of the second frame 102 while being spaced apart by a predetermined tolerance (d). Accordingly, the sixth conductor 432 may move along with the second frame 102 along the fifth conductor 421, and may generate the third capacitance C3 together with the fifth conductor 431.

As can be seen from FIG. 12, in order to subdivide the stroke of the second frame 102, the stroke distance (d1, L1) of the second frame 102, or the position within the stroke, the third capacitor 430 may be configured to generate the third capacitance C3 composed of the sub-capacitances (C3a) that are generated at intervals of a predetermined distance within the stroke of the second frame 102. That is, the third capacitance C3 may include the sub-capacitances (C3a) generated repeatedly during the stroke of the second frame 102. Also, as shown in the drawings, the respective sub-capacitances (C3a) may be configured to vary depending on the movement of the second frame 102. Thus, each sub-capacitance (C3a) (i.e., the operation of detecting each sub-capacitance C3a) may basically represent a specific point of the stroke or the stroke distance (d1, L1) or a specific section including the specific point. In addition, the change in each sub-capacitance (C3a) may indicate the position and movement amount of the second frame 102 at the specific point or within the specific section. For this reason, the third capacitance C3 may more accurately indicate the second frame 102 while subdividing the stroke or the stroke distance (d1, L1) of the second frame 102 and the position within the stroke.

In the third capacitor 430, the fifth conductor 431 may include segments 431a that are arranged at intervals of a predetermined distance within the stroke of the second frame 102 or the stroke distance (d1 or L1) of the second frame 102 to generate periodically repeated sub-capacitances (C3a). Further, in order to indicate the position and movement amount of the second frame 102 at a specific point or a specific section of the second frame 102, each of the segments 431a may be configured to generate the third capacitance C3 (i.e., the sub-capacitance C3a) that is changed during the movement of the second frame 102, along with the sixth conductor 432. In order to form the changed sub-capacitance (C3a), each of the segments 431a may extends in the movement direction of the second frame 102 by a predetermined length L2, and may have a constant shape similar to that of the third conductor 421 of the second capacitor 420. When the above-described stroke distance or the length L1 of the first, third, and fifth conductors 431 is referred to as the first length, the length L2 of the segment 431a may be denoted by a second length. The second length L2 may have a significantly smaller value than the first length L1 to indicate a specific point within the stroke or a specific section within the stroke. As shown in FIGS. 9 to 12, the segments 431a of the fifth conductor 431 may have the same shape, particularly the same second length L2, to indicate a change in the same third capacitance C3 (i.e., the change in sub-capacitance C3a) at a particular point or at a particular section for accuracy of detection. As an example, as shown in the drawings, the segments 431a of the fifth conductor 431 may have a rectangle formed over a particular point or section (i.e., the second length L2) at intervals of a predetermined distance, and may have any constant shape as defined above. On the other hand, in order to form the changing sub-capacitance (C3a) instead of the segments 431a having the above-described shape, the respective segments 431a may extend in the movement direction of the second frame 102 by the second length L2 as denoted by the dotted line of FIG. 12, and may have a shape that continuously changes over the second length L2 in a similar way to the first conductor 421 of the first capacitor 410. For example, as shown in the drawings, the segments 431a of the fifth conductor 431 may have a right-angled triangular shape formed over a specific point or specific section (i.e., the second length L2) at intervals of a predetermined distance, and may have any constant shape that is continuously changing as described above. In addition, due to the arrangement of the repetitive segments 341a (e.g., rectangular or right-angled triangular segments), the fifth conductors 531 may be disposed relatively between the segments, and may thus include empty spaces 431b disposed in the stroke of the second frame 102 or the stroke distance (d1 or L1) of the second frame 102 at intervals of a predetermined distance in a similar way to the above-described segments 431a. Accordingly, the fifth conductor 531 may include the segments 431a and the empty spaces 431b that are alternately disposed along the stroke of the second frame 102 or the stroke distance (d1 or L1) of the second frame 102. The empty spaces 431b may have the same length (i.e., the second length L2) as the segments 431a so that a specific point or specific section intended by the segments 431a can be specified and defined constantly.

When the sixth conductor 432 moves along with the second frame 102 on any one segment 431a of the fifth conductor 431 within the stroke, the segments 431a and the sixth conductor 432 may form an overlap area that is changed during the movement of the second frame 102. For example, as shown in FIG. 12, in the case of the rectangular segments 431a, the overlap area between the sixth conductor 432 and the segment 431a may gradually increase in size. Then, when the sixth conductor 432 and the segment 431a completely overlap each other (see the points A, C, and E), the overlap area can be maximized in size. Thereafter, the overlap area between the sixth conductor 432 and the segment 431a may gradually decrease again. When the sixth conductor 432 completely overlaps with the empty space 432b (see the points B and D), the overlap area can be minimized in size. On the other hand, in the case of the right-angled triangular segment 431a, when the sixth conductor 432 completely overlaps with the empty region 432b, the overlap area may increase continuously over the second length L2. Accordingly, the third capacitance C3 generated by the third capacitor 430 may include a periodically repeated sub-capacitance (C3a), and each sub-capacitance C3a may be changed while including a predetermined peak (C3b). More specifically, in the case of the rectangular segment 431a, the sub-capacitance (C3a) may increase around a predetermined peak C3b and then decrease. In contrast, in the case of the right-angled triangular segment 431b, the sub-capacitances (C3a) may vary continuously over the second length L2 in a similar way to the first capacitance C1. In addition, the sub-capacitances (C3a) can be distinguished from each other by the bottom (C3c) corresponding to the empty space 431b.

Therefore, the controller 180 may determine a specific point or a specific region of the stroke of the second frame 102 using the detected bottom C3c, and may more accurately determine the position and movement amount of the second frame 102 at the corresponding specific point or at the corresponding specific area using the detected sub-capacitance (C3a). More specifically, the controller 180 may calculate the number of the bottoms C3c (or peaks C3b) detected during the movement of the second frame 102 to calculate the number of the segments 431a and the number of empty spaces 431b through which the second frame 102 has passed. Therefore, the second length L2 is multiplied by the number of segments 431a and the number of empty spaces 431b, such that it is possible to calculate a preliminary distance (i.e., a primary distance) by which the second frame 102 (i.e., the sixth conductor 432) has moved before reaching the current segment 431a (i.e., a specific point or a specific section). In addition, the controller 180 may calculate a detailed distance (i.e., a secondary distance) by which the second frame 102 (i.e., the sixth conductor 432) has moved within a specific point or a specific section in consideration of the value of the sub-capacitances (C3a) generated by the current segment 431a where the sixth conductor 432 is currently located. As a result, the controller 180 may accurately calculate the position and movement amount of the second frame 102 by calculating the sum of the preliminary distance and the detailed distance. That is, the detection device 400 may determine the position and movement amount of the second frame 102 using only the third capacitor 430.

In addition, the controller 180 may determine the position and movement amount of the second frame 102 using the third capacitor 430 together with the first capacitor 410. That is, the controller 180 may calculate the preliminary distance using the first capacitance C1 of the first capacitor 410, instead of using the number of bottoms C3c (or the number of peaks C3b). More specifically, generally, the first capacitance C1 may represent the position of the absolute second frame 102 within the stroke. Accordingly, based on the absolute position of the second frame 102, the number of segments 431a and the number of empty spaces 431b through which the second frame 102 has passed can be calculated, and the second length is multiplied by the number of segments 431a and the number of empty spaces 431b, so that the preliminary distance by which the sixth conductor 432 has moved before reaching the current segment 431a (i.e., a specific point or a specific section) can be calculated. In addition, the controller 180 may calculate a detailed distance (i.e., a secondary distance) by which the second frame 102 (i.e., the sixth conductor 432) has moved within a specific point or a specific section in consideration of the value of the sub-capacitances (C3a) generated by the current segment 431a where the sixth conductor 432 is currently located. As a result, the controller 180 may calculate the position and movement amount of the second frame 102 by calculating the sum of the preliminary distance and the detailed distance.

As described above, in order to reduce error(s), the controller 180 may also determine the position and movement amount of the second frame 102 using the second and third capacitors 420 and 430. In more detail, the controller 180 may first calculate the same preliminary distance as described above using the number of detected bottoms C3c (or peaks C3b). However, in order to remove the errors, the detailed distance (i.e., the movement distance at a specific point or at a specific section) can be expressed and calculated based on the proportional equation. More specifically, when the second frame 102 moves by a predetermined movement amount (y) within a specific point or specific section of the segment 431a where the second frame 102 is currently located, the third capacitor 430 may generate the third capacitance C3, precisely, the sub-capacitance C3a. At the same time, the second capacitor 420 may generate a second constant capacitance C2 for the entire second distance L2. This relationship can be represented by the following equation.

$$y:C3 = L2:C2$$
$$\therefore y = L2\frac{C3}{C2}$$

As shown in the above proportional equation, the position and movement amount (i.e., the detailed distance) of the second frame 102 within a specific section may be represented by the product of the second length L2 and the ratio of the third capacitance C3 to the second capacitance C2. In the above-described ratio and proportional equation, the second capacitance C2 may have any constant value with respect to the third capacitance C3, but is not limited thereto. As can be seen from FIG. 12 showing the proportional relationship, the second capacitance C2 may have the same value as a maximum value (i.e., the peak C3b) of the third capacitance C3 generated when the second frame 102 moves by the second distance L2. Therefore, the controller 180 may more accurately determine the position and movement amount of the second frame 102 using the second and third capacitors 420 and 430.

Furthermore, in order to maximally minimize the errors, the controller 180 may also determine the position and movement amount of the second frame 102 using all of the first to third capacitors 410, 420, and 430. In this case, the controller 180 may first calculate the number of segments 431a of the fifth conductor 431 through which the second frame 192 has passed, based on the amount of change (i.e., the ratio) of the first capacitance C1 to the second capacitance C2. As described above, since the first capacitance C1 may represent the absolute position of the second frame 102 within the stroke, the preliminary distance by which the second frame 102 (i.e., the sixth conductor) has moved before reaching the current segment 431a (i.e., a specific point or a specific section) can be calculated using the first capacitance C1. In order to remove the error generated in the calculation process of the preliminary distance, the amount of change (i.e., the ratio) of the first capacitance C1 to the second capacitance C2 may be used, such that the absolute position (x) of the following second frame 102 can be used as previously described in connection with the combination of the first and second capacitors 410 and 420.

$$x = L1\frac{C1}{C2}$$

For example, as shown in FIG. 12, when the second frame 102 moves to the position S, the first capacitance C1 may have a specific value (C1a) at the corresponding position S. The absolute position (x) of the second frame 102 may be calculated using the value (C1a) as the first capacitance C1, and the number of segments 431a and empty spaces 431b through which the second frame 102 has passed can be calculated based on the absolute position (x). That is, as can be seen from the example of FIG. 12, when considering the absolute position (x), it is determined that the second frame 102 has passed through one segment 431a (C point) and two empty spaces 431b (B and D points), so that the preliminary distance may be denoted by (3×L2).

In addition, the controller 180 may calculate a relative position of the second frame 102 at the segment 431a (E position) through which the second frame 102 passes based on the ratio (the amount of change) of the sub-capacitance (C3 or C3a) to the second capacitance C2. That is, in consideration of the ratio of the third capacitance or sub-capacitance (C3 or C3a) to the second capacitance C2, the controller 180 may calculate the detailed distance from which the error was removed. The detailed distance can be represented by the following equation as described above.

$$y = L2 \frac{C3}{C2}$$

Finally, the controller 180 may be configured to calculate the position S of the second frame 102 using the calculated number and the calculated relative position. That is, the controller 180 may calculate the sum of the preliminary distance caused by the calculated number and the calculated detailed distance, and may calculate the position S of the second frame 102 using the calculated result, as represented by the following equation.

$$\therefore S = n \cdot L2 + L2 \frac{C3}{C2}$$

(where, 'n' is the calculated number of segments and empty spaces)

Therefore, the controller 180 can minimize errors in both the preliminary distance and the detailed distance by using all of the first to third capacitors 410 to 430, so that the most accurate position and movement amount of the second frame 102 can be determined.

As described above, the controller 180 may determine the position and movement amount of the second frame 102 using only the first capacitor 410, using only the third capacitor 430, using a combination of the first and second capacitors 410 and 420, using a combination of the first and third capacitors 410 and 430, using a combination of the second and third capacitors 420 and 430, and/or using a combination of the first to third capacitors 410 to 430. If necessary, the controller 180 may determine the position and movement amount of the second frame 102 using one or more combinations from among the above-described methods.

On the other hand, the stroke start point and the stroke end points of the second frame 102 (i.e., the first and second points A1 and A2) may serve as the reference of the stroke of the second frame 102, so that the second frame 102 can play an important role in the control of the second frame 102. More specifically, the accurate detection of the second frame 102 disposed at the first and second points A1 and A2 may provide an accurate reference point for the movement of the second frame 102, so that the position and movement amount of the second frame 102 can be accurately detected based on this reference point. Also, the second frame 102 located at the first and second points A1 and A2 can be detected so that the start and end of the movement of the second frame 102 can be immediately controlled. For this reason, the detection device 400 may further include a first position capacitor 440 configured to detect that the second frame 102 is located at the stroke start point (i.e., the first point A1). For the same reason, the detection device 400 may further include a second position capacitor 450 configured to detect that the second frame 102 is located at the stroke end point (i.e., the second point A2). Actually, the first and second points A1 and A2 may correspond to the stroke start and end points in the movement of the first direction D1 of the second frame 102. In contrast, the first and second points A1 and A2 may correspond to the stroke end and start points in the movement of the second frame 102. Accordingly, when the second frame 102 moves in the second direction D2, the first position capacitor 440 may detect that the second frame 102 is located at the stroke end point, and the second position capacitor 450 may detect that the second frame 102 is located at the stroke start point. In the following, the characteristics of the first and second position capacitors 440 and 450 are described with reference to the movement of the second frame 102 moving in the first direction D1, but these features s can be equally applied to the first and second position capacitors 440 and 450 during the movement of the second frame 102 moving in the second direction D2.

Figure 13:
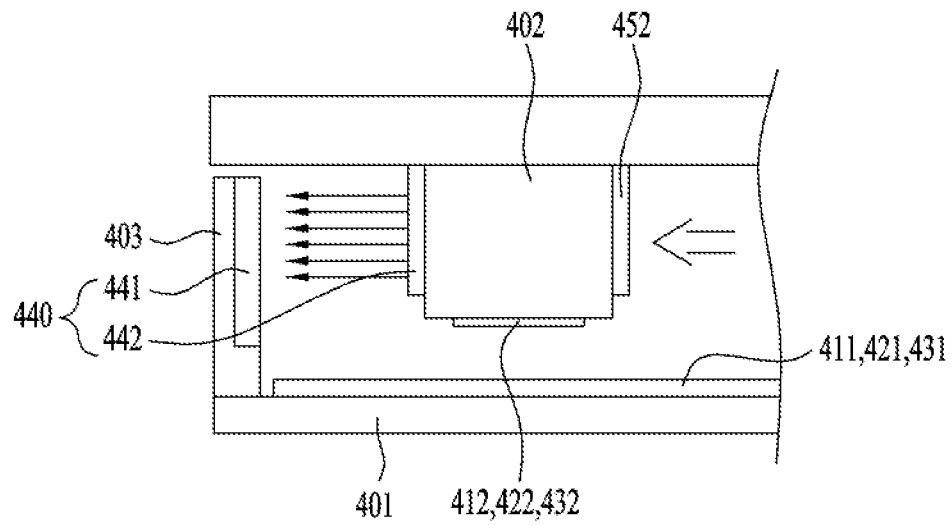
FIG. 13 is a partial side view illustrating the detection device at a stroke start point of the second frame.
Figure 14:
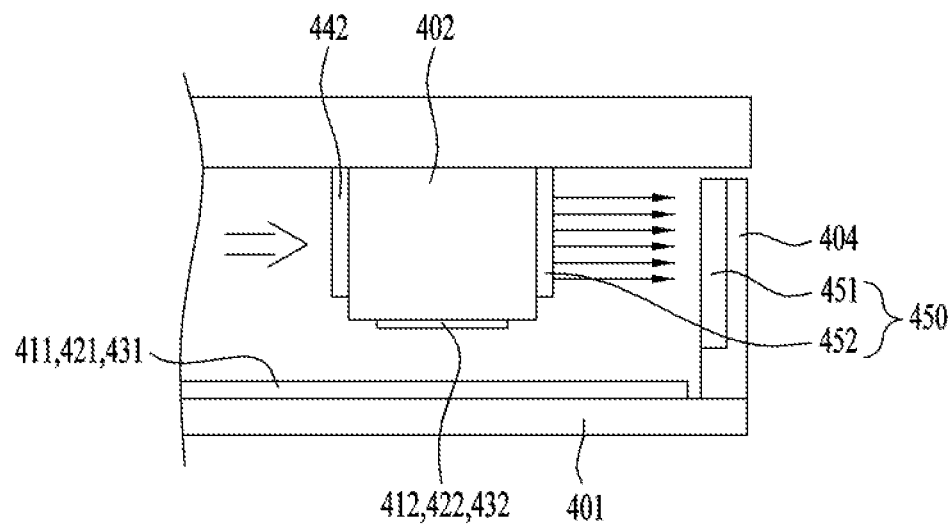
FIG. 14 is a partial side view illustrating the detection device at a stroke end point of the second frame.
Figure 15:
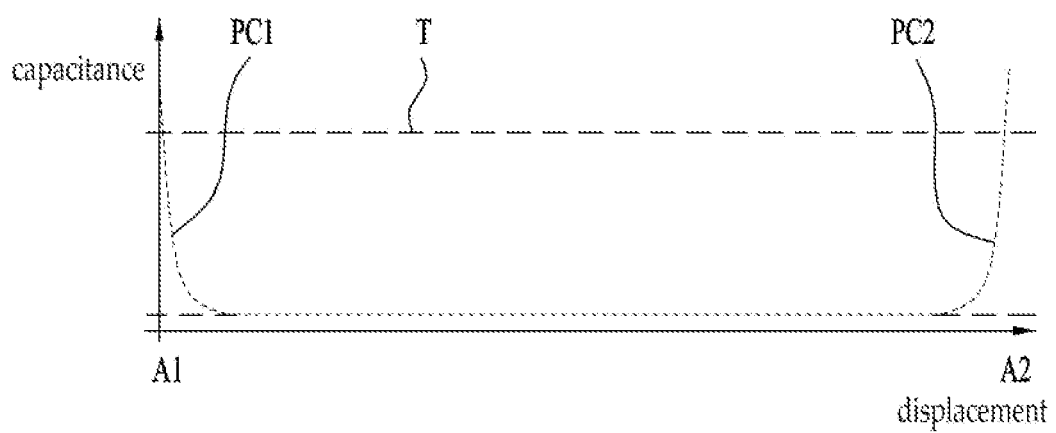
FIG. 15 is a graph illustrating capacitances of the first and second position capacitors of the detection device at the stroke start point and the stroke end point of the second frame.

FIG. 13 is a partial side view illustrating the detection device at the stroke start point of the second frame. FIG. 14 is a partial side view illustrating the detection device at the stroke end point of the second frame. FIG. 15 is a graph illustrating capacitances of the first and second position capacitors of the detection device at the stroke start point and the stroke end point of the second frame. In addition, FIGS. 9 to 12 show the overall configuration of the detection device 400 including the first and second position capacitors 440 and 450, and thus FIGS. 9 to 12 will be described together with FIGS. 13 to 15 in the following.

Referring to FIGS. 9 to 12 and FIG. 13, the first position capacitor 440 may include a first position conductor 441 disposed at the first point A1 representing the stroke start point of the second frame 102. For example, as described above, when the first frame 401 and the first, third, and fifth conductors 411, 421, and 431 have the first length L1 corresponding to the stroke distance (d1), the first position conductor 441 may be directly disposed at the first point A1. On the other hand, as described above, when the first frame 401 and the first, third, and fifth conductors 411, 421, and 431 have the first length L1 that is shorter than the stroke distance (d1) on a predetermined scale, the first position conductor 441 may be disposed at another position on the first frame 101 corresponding to the first position A1 according to this scale. More specifically, the first platform 401 may include a first partition 403 disposed at an end thereof corresponding to the first point A1, and the first position conductor 441 may be disposed in the first partition 403. On the other hand, the first position capacitor 440 may include a second position conductor 442 configured to face the first position conductor 441 when the second frame 102 is disposed at the stroke start point (i.e., the first point A1). More specifically, the second position conductor 442 may be disposed on the side of the second platform 402 to face the first position conductor 441 on the first partition 403. Therefore, when the second frame 102 moves in the first or second direction D1 or D2 according to a predetermined stroke, the second position conductor 442 moves closer to or away from the first position conductor 441, and generates the first position capacitance PC1 as shown in FIG. 22.

In addition, the second position capacitor 450 may include a third position conductor 451 disposed at a point representing the second point A2 corresponding to the stroke end point of the second frame 102. For example, as described above, when the first platform 401 and the first, third, and fifth conductors 411, 421, and 431 have the first length L1 corresponding to the actual stroke distance (d1), the third position conductor 451 may be disposed directly at the second point A2. On the other hand, as described above, when the first platform 401 and the first, third, and fifth conductors 411, 421, and 431 have the first length L1 that is shorter than the stroke distance (d1) on a predetermined scale, the third position conductor 451 may be disposed at other positions on the first frame 101 corresponding to the second position A1 according to this predetermined scale. More specifically, the first platform 401 may include a second partition 404 disposed at an end thereof corresponding to the second point A2, and the third position conductor 451 may be disposed at the second partition 404. On the other hand, when the second frame 102 is disposed at the stroke end point (i.e., the second point A1), the second position capacitor 450 may include a fourth position conductor 452 configured to face the third position conductor 451. More specifically, the fourth position conductor 452 may be disposed on the side of the second platform 402 to face the third position conductor 451 located at the second partition 404. That is, the second position conductor 442 and the fourth position conductor 452 may be disposed to face each other on the second platform 402. Thus, when the second frame 102 moves in the first or second direction D1 or D2 according to a predetermined stroke, the fourth position conductor 452 moves closer to or away from the third position conductor 451, and thus generate the second position capacitance PC2 as shown in FIG. 22.

As described above, the capacitance of the capacitor is inversely proportional to the distance between the facing conductors. That is, if the distance between the facing conductors is increased, capacitance of the capacitor may decrease, and if the distance between the facing conductors is reduced, capacitance of the capacitor may increase. Thus, as well shown in FIG. 13, when the second frame 102 moves away from the first point A1 (indicating the stroke start point) together with the second position conductor 442 according to the above-described arrangement, the distance between the first and second position conductors 441 and 442 may increase, and the first position capacitance PC1 may rapidly decrease, as shown in FIG. 15. On the other hand, when the second frame 102 approaches the first point A1 (indicating the stroke start point) together with the second position conductor 442, the distance between the first and second position conductors 441 and 442 may decrease, and the first position capacitance PC1 may rapidly increase as shown in FIG. 15. Therefore, when the first position capacitor 440 generates capacitance equal to or greater than a predetermined threshold (i.e., when the first position capacitance PC1 is equal to or greater than the predetermined threshold T), the controller 180 may determine the second frame to be located at the first point A1 indicating the stroke start point.

Similarly, as well shown in FIG. 14, when the second frame 102 moves away from the second point A2 (indicating the stroke end point) together with the fourth position conductor 452 according to the above-described arrangement, the distance between the third and fourth position conductors 452 and 452 may increase, and the second position capacitance PC2 may rapidly decrease, as shown in FIG. 15. On the other hand, when the second frame 102 approaches the second point A2 (indicating the stroke end point) together with the fourth position conductor 452, the distance between the third and fourth position conductors 452 and 452 may decrease, and the second position capacitance PC2 may rapidly increase as shown in FIG. 15. Therefore, when the second position capacitor 450 generates capacitance equal to or greater than a predetermined threshold (i.e., when the second position capacitance PC2 is equal to or greater than the predetermined threshold T), it can be determined that the second frame 102 is located at the second point A2 indicating the stroke end point.

Accordingly, when it is detected that the second frame 102 is located at the first or second point A1 or A2, the controller 180 immediately stops the operation of the driving unit 200. The situation in which the second frame 102 is located at the first or second point A1 or A2 may be indirectly determined based on the operation of detecting the position and movement amount of the second frame 102 caused by the first to third capacitors 410 to 430, but is not limited thereto. Such detection may be affected by various erroneous factors as described above. On the other hand, the controller 180 directly determines that the second frame 102 is located at the first or second point A1 or A2 using the first and second position capacitors 440 and 450, so that the controller 180 can accurately stop the second frame 102 at the first and second points A1 and A2, thereby preventing damage to the surrounding components.

Figure 16:
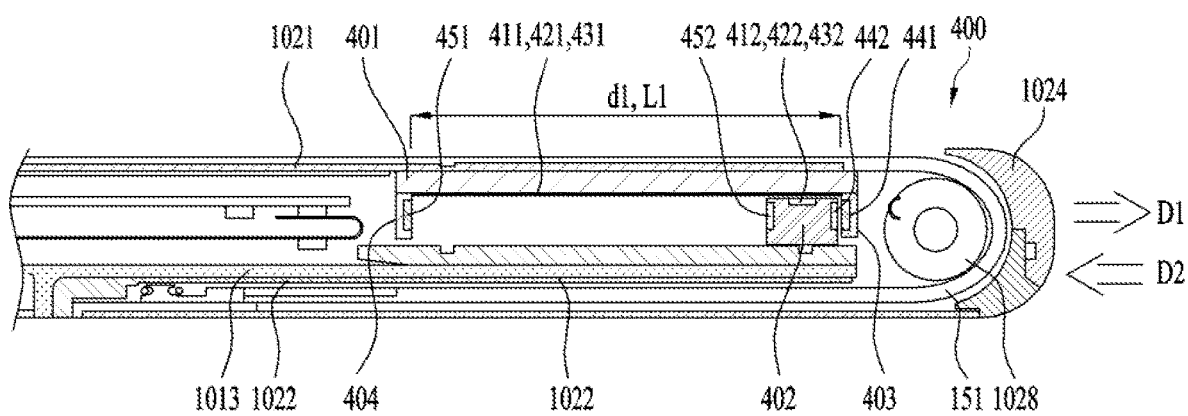
FIG. 16 is a schematic diagram illustrating a modified example of the detection device.

In the configuration of the detection device 400 described above with reference to FIGS. 9 to 15, the first platform 401 and the conductors 411, 421, 431, 441, and 451 are installed in the relatively stationary first frame 101. In contrast, the second platform 402 and the conductors 412, 422, 432, 442, and 452 are installed in the second frame 102 and are configured to move together with the second frame 102. However, in any case considering the principle of the detection device 400, when the conductors 411, 421, 431, 441, and 451 and other conductors 412, 422, 432, 442, and 452 move relatively to each other, the change in intended capacitance C1-C3, PC1, and PC2 may occur. Thus, in contrast to the configuration of FIGS. 9 to 15, as shown in FIG. 16, the second platform 402 and the conductors 412, 422, 432, 442, and 452 are installed in the relatively stationary first frame 101. In contrast, the first platform 401 and the conductors 411, 421, 431, 441, and 451 are installed in the second frame 102, and may be configured to move together with the second frame 102. Considering the configuration of FIGS. 9 to 15 and the configuration of FIG. 16, in the detection device 400, the conductors 411, 421, 431, 441, and 451 may be installed in any one of the first and second frames 101 and 102, and the other conductors 412, 422, 432, 442, and 452 may be installed in the other one from among the first and second frames 101 and 102. Further, the conductors 411, 421, 431, 441, and 451 or the conductors 412, 422, 432, 442, and 452 are relatively moved to generate a change in intended capacitances (C1-C3, PC1, PC2). Furthermore, although the features of the detection device 400 have been described in connection with the movement of the second frame 102 moving in the first direction D1, these features may be equally applied to the detection device 400 at the time of movement of the second frame moving in the second direction D2.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A mobile terminal comprising:
    a first frame;
    a second frame movably coupled to the first frame, and configured to move in a first direction with respect to the first frame or in a second direction opposite to the first direction so as to form a predetermined stroke;
    a third frame movably coupled to the second frame and configured to move in the first direction or the second direction with respect to the second frame;
    a flexible display including a first region disposed at a front surface of the mobile terminal and coupled to the first frame, a second region disposed at a rear surface of the mobile terminal and coupled to the third frame, and a third region formed to extend between the first and second regions, wherein the third region is wound on the second frame and is selectively disposed on the front surface of the mobile terminal or the rear surface of the mobile terminal;
    a driving unit configured to move the second frame in the first or second direction with respect to the first frame and to move the third frame in the first or second direction with respect to the second frame;
    a detection device that includes at least one capacitor comprising conductors respectively arranged in the first and second frames to face each other and that measures a change in capacitance generated in conductors provided to the first and second frames by movement of the second frame moving in the first or second direction; and
    a controller configured to determine the amount of movement of the second frame based on a change in the generated capacitance and control operation of the mobile terminal based on the amount of movement of the second frame measured by the detection device,
    wherein the conductors are configured to have an overlap area that is changed in size while the second frame relatively moves with respect to the first frame to change the capacitance.

2. The mobile terminal according to claim 1, wherein:
    in order to expand a screen on the front surface of the mobile terminal, the driving unit is configured to move the second and third frames in the first direction to switch the mobile terminal from a first state to a second state,
    wherein, in the first state, only a first region of the flexible display is disposed at the front surface of the mobile terminal, and in the second state, the third region is disposed at the front surface of the mobile terminal along with the first region; and
    in order to perform switching to the second state, the driving unit is configured to draw the third region from the second frame to the front surface of the mobile terminal according to movement of the second frame moving in the first direction.

3. The mobile terminal according to claim 2, wherein:
    in order to contract a screen on the front surface of the mobile terminal, the driving unit is configured to move the second and third frames in the second direction to switch the mobile terminal from the second state to the first state; and
    in order to perform switching to the first state, the driving unit is configured in a manner that the drawn third region is contracted from the front surface of the mobile terminal to the second frame.

4. The mobile terminal according to claim 1, wherein the detection device includes:
    a first capacitor configured to indicate an absolute position of the second frame within the stroke of the second frame.

5. The mobile terminal according to claim 4, wherein:
    the first capacitor is configured to generate a first capacitance that is continuously changed during the stroke of the second frame.

6. The mobile terminal according to claim 5, wherein the first capacitor includes:
    a first conductor provided to any one of the first and second frames, and extending to have a shape that is continuously changed over a stroke distance of the second frame; and
    a second conductor provided to the other one from among the first and second frames and disposed to face the first conductor,
    wherein any one of the first and second conductors is configured to generate a first capacitance that is continuously changed during the stroke of the second frame while relatively moving with respect to the other one from among the first and second conductors.

7. The mobile terminal according to claim 5, wherein the detection device further includes:
    a second capacitor configured to generate a second capacitance that is a predetermined reference capacitance during the stroke of the second frame.

8. The mobile terminal according to claim 7, wherein:
    the second capacitance has a constant value over the stroke of the second frame.

9. The mobile terminal according to claim 7, wherein the second capacitor includes:
    a third conductor provided to any one of the first and second frames, and extending to have the same shape over a stroke distance of the second frame; and
    a fourth conductor provided to the other one from among the first and second frames and disposed to face the third conductor,
    wherein any one of the third and fourth conductors is configured to generate a constant second capacitance during the stroke of the second frame while relatively moving with respect to the other one from among the third and fourth conductors.

10. The mobile terminal according to claim 7, wherein:
    the controller is configured to determine the position and movement amount of the second frame based on the amount of change of the first capacitance with respect to the second capacitance.

11. The mobile terminal according to claim 7, wherein the detection device further includes:
    a third capacitor configured to generate a third capacitance consisting of sub-capacitances that are repeated at intervals of a predetermined distance within the stroke of the second frame.

12. The mobile terminal according to claim 11, wherein:
    each of the sub-capacitances is configured to be changed according to the movement of the second frame.

13. The mobile terminal according to claim 12, wherein the third capacitor includes:

a fifth conductor provided to any one of the first and second frames, and configured to have segments that have the same shape while being arranged at intervals of a predetermined distance within the stroke of the second frame; and a sixth conductor provided to the other one from among the first and second frames and disposed to face the fifth conductor, wherein any one of the fifth and sixth conductors is configured to generate constant sub-capacitances at intervals of a predetermined distance during the stroke of the second frame while relatively moving with respect to the other one from among the fifth and sixth conductors.

14. The mobile terminal according to claim 13, wherein the controller is configured to:

calculate the number of segments of the fifth conductor through which the second frame has passed, based on the amount of change in the first capacitance with respect to the second capacitance;

calculate a relative position of the second frame at a segment through which the second frame is passing, based on the amount of change in the sub-capacitance with respect to the second capacitance; and calculate a position of the second frame based on the calculated number of segments and the calculated relative position.

15. The mobile terminal according to claim 1, wherein the detection device further includes:

a first position capacitor configured to detect that the second frame is located at a start point of the stroke, and a second position capacitor configured to detect that the second frame is located at an end point of the stroke.

16. The mobile terminal according to claim 15, wherein the first position capacitor includes:

a first position conductor disposed at a start point of the stroke of the second frame; and a second position conductor configured to face the first position conductor when the second frame is disposed at the start point of the stroke.

17. The mobile terminal according to claim 16, wherein the second position capacitor includes:

a third position conductor disposed at an end point of the stroke of the second frame; and a fourth position conductor configured to face the third position conductor when the second frame is disposed at an end point of the stroke.

18. The mobile terminal according to claim 17, wherein:

when the first position capacitor generates a capacitance equal to or greater than a predetermined threshold, the controller is configured to determine that the second frame is located at the stroke start point; and when the second position capacitor generates a capacitance equal to or greater than a predetermined threshold, the controller is configured to determine that the second frame is located at the stroke end point.

* * * * *